US011461786B2

(12) United States Patent
Knapp et al.

(10) Patent No.: US 11,461,786 B2
(45) Date of Patent: Oct. 4, 2022

(54) SYSTEMS, METHODS, AND APPARATUSES FOR IMPLEMENTING CROSS CLOUD ENGAGEMENT ACTIVITY VISUALIZATION WITHOUT REQUIRING DATABASE MERGE OR DATA REPLICATION

(71) Applicant: salesforce.com, inc., San Francisco, CA (US)

(72) Inventors: Mark Knapp, San Francisco, CA (US); Meredith Brown, Piedmont, CA (US); Vignesh Elamvazhuthi, Milpitas, CA (US); Gauri Subodh Mawalankar, Pleasanton, CA (US); Jia Chen, Palo Alto, CA (US); Kattie Mun Mun Tay, San Francisco, CA (US); Spencer Derek Williams, Woodstock, GA (US); Ovidio Peduri, Atlanta, GA (US); Daniel Dara, Hollywood, FL (US); Juan Nunez, Atlanta, GA (US); Tal Levy Meruk, Walnut Creek, CA (US)

(73) Assignee: salesforce.com, inc., San Francisco, CA (US)

( * ) Notice: Subject to any disclaimer, the term of this patent is extended or adjusted under 35 U.S.C. 154(b) by 76 days.

(21) Appl. No.: 16/806,498

(22) Filed: Mar. 2, 2020

(65) Prior Publication Data
US 2021/0272129 A1    Sep. 2, 2021

(51) Int. Cl.
*G06Q 30/00* (2012.01)
*G06F 16/9035* (2019.01)
(Continued)

(52) U.S. Cl.
CPC .......... *G06Q 30/01* (2013.01); *G06F 3/0482* (2013.01); *G06F 9/45558* (2013.01);
(Continued)

(58) Field of Classification Search
CPC .. G06Q 30/01; G06Q 3/0242; G06Q 30/0242; G06F 16/256; G06F 16/9035;
(Continued)

(56) References Cited

U.S. PATENT DOCUMENTS 9,009,201 B2 * 4/2015 Jacobson ............ G06F 16/3331
707/711
9,436,813 B2 * 9/2016 Morley ................ G06F 21/105
(Continued)

*Primary Examiner* — Phuong Thao Cao
(74) *Attorney, Agent, or Firm* — Elliott, Ostrander & Preston, P.C.

(57) ABSTRACT

Described herein are means for implementing cross cloud engagement activity visualization without requiring database merge or data replication. For instance, an exemplary system includes: means for operating a database system communicably interfaced with the system of the host organization; means for operating a virtual entity bridge communicably interfacing the system with a remote cloud platform storing engagement activity data representing interactions of potential customers with a marketing campaign; means for generating a unified GUI to display a plurality of the CRM records at a user computing device; means for surfacing a plurality of related rows from the stored engagement activity data related to one of the plurality of CRM records by automatically querying the remote cloud platform via the virtual entity bridge for the plurality of related rows; means for populating the unified GUI with the surfaced plurality of rows; and means for transmitting the unified GUI to the user computing device for display.

21 Claims, 12 Drawing Sheets

(51) Int. Cl.
*G06Q 30/02* (2012.01)
*G06F 16/2457* (2019.01)
*G06F 3/0482* (2013.01)
*H04L 67/10* (2022.01)
*G06F 9/455* (2018.01)
*G06F 16/9535* (2019.01)
*G06F 16/25* (2019.01)

(52) U.S. Cl.
CPC ...... *G06F 16/24575* (2019.01); *G06F 16/256* (2019.01); *G06F 16/9035* (2019.01); *G06F 16/9535* (2019.01); *G06Q 30/0242* (2013.01); *H04L 67/10* (2013.01)

(58) Field of Classification Search
CPC ............. G06F 16/24575; G06F 3/0482; G06F 9/45558; G06F 16/9535; H04L 67/10
USPC .......................................................... 707/732
See application file for complete search history.

(56) References Cited

U.S. PATENT DOCUMENTS

| | | | | |
|---|---|---|---|---|
| 9,633,399 | B2 * | 4/2017 | George | G06Q 30/0277 |
| 10,248,297 | B2 * | 4/2019 | Beechuk | G06F 3/04842 |
| 10,318,618 | B2 * | 6/2019 | Sevilmis | G06F 16/24552 |
| 10,394,916 | B2 * | 8/2019 | Tus | H04L 63/102 |
| 2011/0161444 | A1 * | 6/2011 | Chauhan | H04L 51/52 |
| | | | | 709/206 |
| 2013/0332263 | A1 * | 12/2013 | Vora | G06Q 50/01 |
| | | | | 705/14.44 |
| 2014/0006580 | A1 * | 1/2014 | Raghu | G06F 9/45558 |
| | | | | 709/223 |
| 2014/0075033 | A1 * | 3/2014 | Doering | H04L 41/5054 |
| | | | | 709/226 |
| 2015/0039600 | A1 * | 2/2015 | Walters | G06F 16/9535 |
| | | | | 707/725 |
| 2015/0172321 | A1 * | 6/2015 | Kirti | H04L 63/1441 |
| | | | | 726/1 |
| 2015/0227518 | A1 * | 8/2015 | Kalian | G06F 16/2358 |
| | | | | 707/725 |
| 2015/0312262 | A1 * | 10/2015 | Doshi | H04L 67/22 |
| | | | | 726/1 |
| 2016/0080341 | A1 * | 3/2016 | Jain | H04L 67/1001 |
| | | | | 726/7 |
| 2016/0103591 | A1 * | 4/2016 | Beechuk | H04L 51/32 |
| | | | | 715/738 |
| 2017/0053288 | A1 * | 2/2017 | Golden | H04L 67/02 |
| 2017/0075922 | A1 * | 3/2017 | Torman | G06F 16/2358 |
| 2017/0188070 | A1 * | 6/2017 | Abed | H04N 21/4882 |
| 2017/0235466 | A1 * | 8/2017 | Tanwir | G06F 9/451 |
| | | | | 715/738 |
| 2017/0251013 | A1 * | 8/2017 | Kirti | H04L 63/1408 |
| 2017/0255948 | A1 * | 9/2017 | Hale | G06Q 30/0201 |
| 2017/0331921 | A1 * | 11/2017 | Moreira da Mota | H04L 67/02 |
| 2018/0210808 | A1 * | 7/2018 | Shanmugam | H04L 41/5067 |
| 2018/0246886 | A1 * | 8/2018 | Dragomirescu | G06F 16/2379 |
| 2019/0081787 | A1 * | 3/2019 | Bayar | H04L 63/30 |
| 2019/0138946 | A1 * | 5/2019 | Asher | G06N 20/20 |
| 2019/0333113 | A1 * | 10/2019 | Carlson | H04L 67/22 |
| 2019/0347695 | A1 * | 11/2019 | Jorge | G06Q 30/0266 |
| 2019/0354964 | A1 * | 11/2019 | Snow | G06F 21/64 |
| 2020/0007529 | A1 * | 1/2020 | Bahrenburg | H04W 12/08 |
| 2020/0159690 | A1 * | 5/2020 | J | G06F 9/44505 |
| 2020/0252475 | A1 * | 8/2020 | Marndi | H04L 67/02 |
| 2021/0194943 | A1 * | 6/2021 | Reynolds | G06F 16/953 |

* cited by examiner

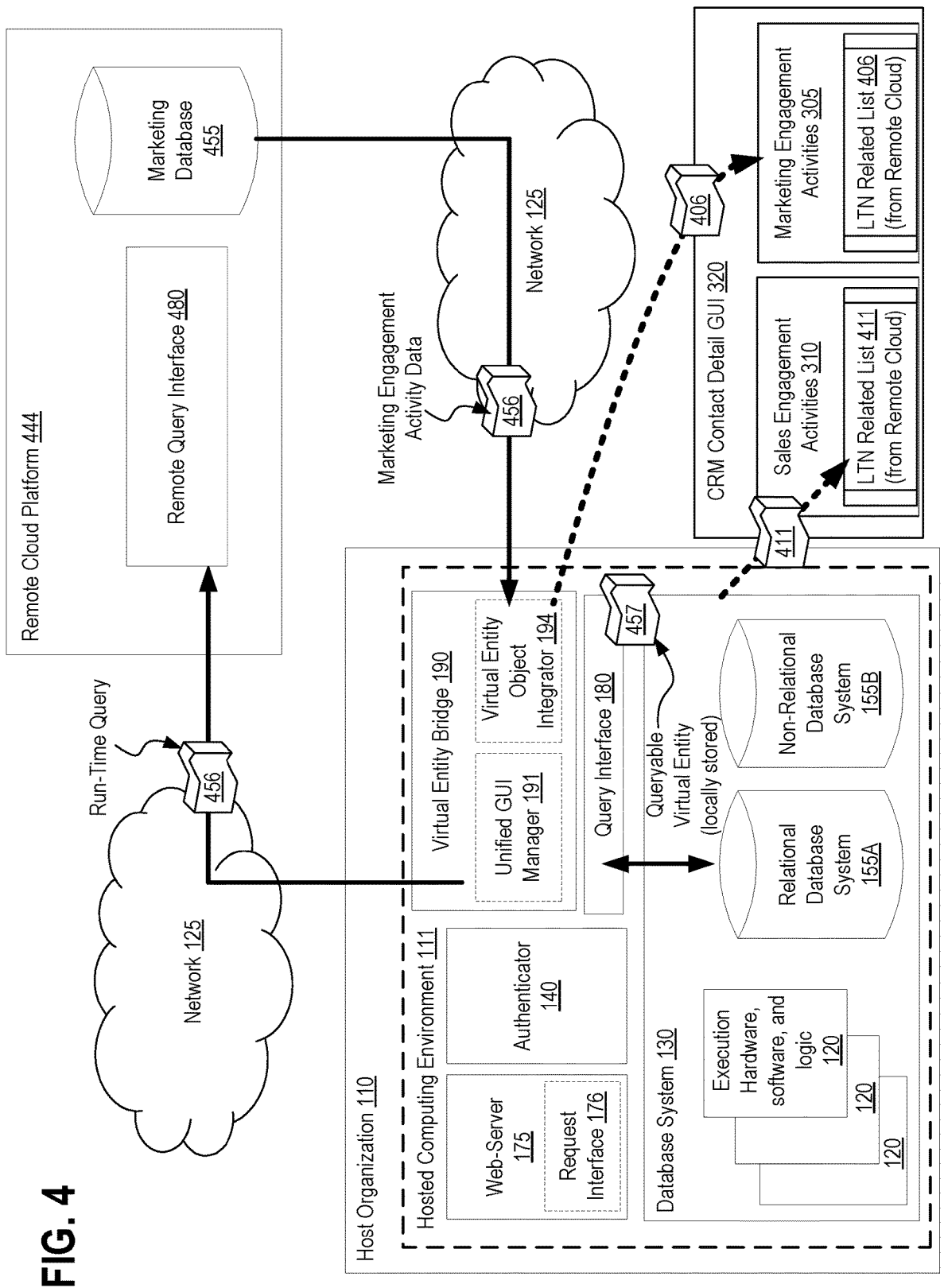

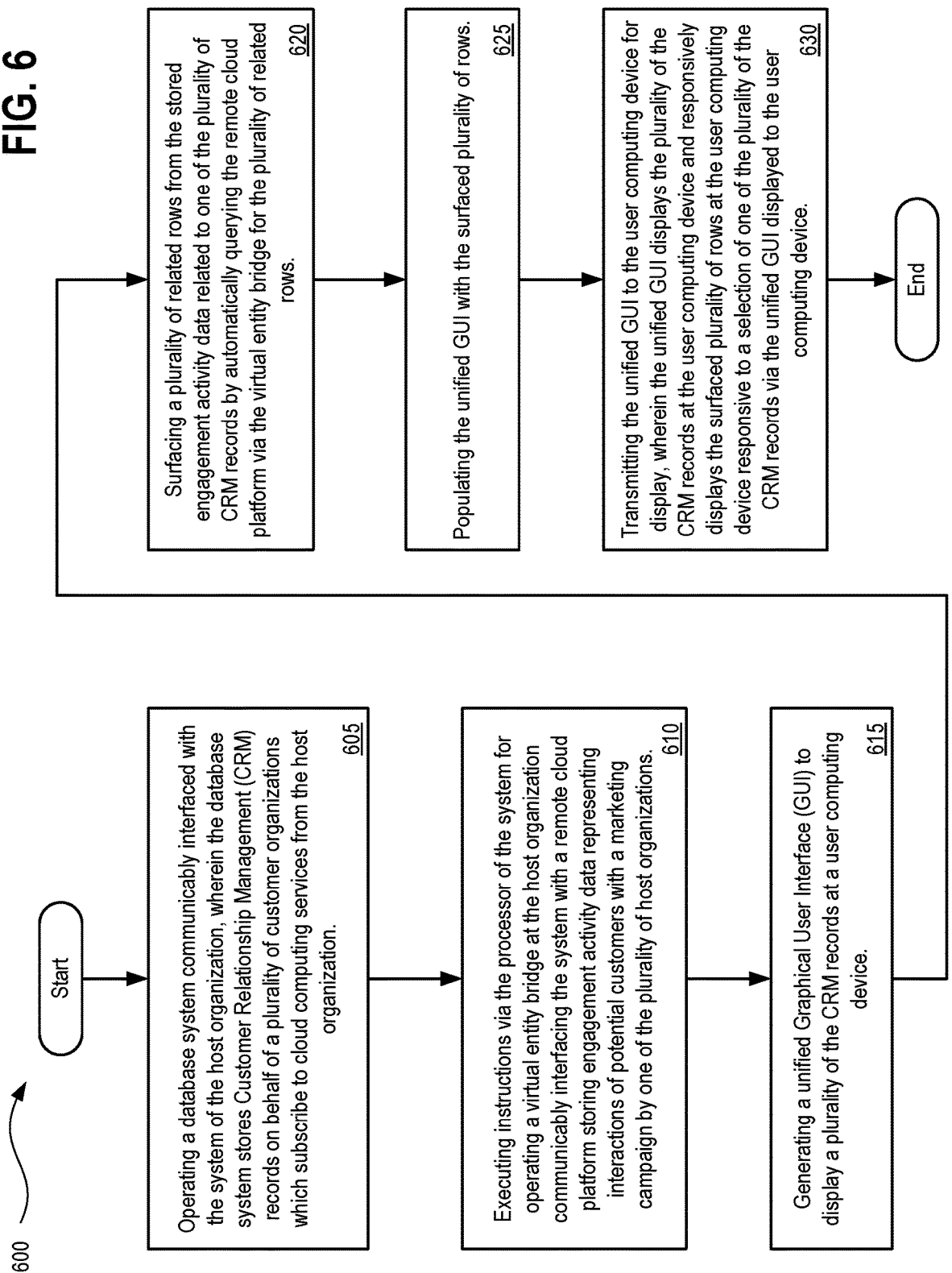

SYSTEMS, METHODS, AND APPARATUSES FOR IMPLEMENTING CROSS CLOUD ENGAGEMENT ACTIVITY VISUALIZATION WITHOUT REQUIRING DATABASE MERGE OR DATA REPLICATION

CLAIM OF PRIORITY

None.

COPYRIGHT NOTICE

A portion of the disclosure of this patent document contains material that is subject to copyright protection. The copyright owner has no objection to the facsimile reproduction by anyone of the patent document or the patent disclosure, as it appears in the Patent and Trademark Office patent file or records, but otherwise reserves all copyright rights whatsoever.

TECHNICAL FIELD

Embodiments disclosed herein relate generally to the field of computing, and more particularly, to systems, methods, and apparatuses for implementing cross cloud engagement activity visualization without requiring database merge or data replication within a cloud based computing environment. Such embodiments may be implemented within the computing architecture of a hosted computing environment, such as an on-demand or cloud-computing environment that utilizes multi-tenant database technologies, client-server technologies, traditional database technologies, or other computing architecture in support of the hosted computing environment.

BACKGROUND

The subject matter discussed in this background section should not necessarily be construed as prior art merely because of its mention in this section. Similarly, a problem mentioned in this section or associated with the subject matter of this section should not be construed as being previously recognized in the prior art. The subject matter in this section merely represents different approaches, which in and of themselves may also correspond to claimed embodiments.

Pardot is a Software as a Service (SaaS) marketing automation platform provided by SalesForce which offers email automation, targeted email campaigns, and lead management for B2B sales and marketing organizations.

Cloud computing customers commonly utilize the Pardot automation platform to automate a variety of marketing tasks, including: tracking customer behaviors; creating digital marketing campaigns; web form management; website tracking; Search Engine Optimization (SEO); social marketing; landing page marketing; creating reports to track performance; lead generation; and personalization of landing page content.

The Pardot automation platform further provides the ability to create email drip campaigns, lead management with nurturing and scoring and campaign segmentation as well as exposing powerful analytics with marketing ROI tracking.

Further still, the Pardot automation platform syncs well with Salesforce's own Customer Relationship Management (CRM) platform, thus yielding a performance edge incentive for existing customers which already utilize the SalesForce CRM platform. For instance, syncing with the Salesforce CRM platform takes less than half the time when compared with alternative solutions available to the marketplace.

Pardot records millions of engagement activities for customers of the cloud computing platform to help such customers track prospect interactions, such as when a prospect opens a marketing email, when a prospect visits a campaign landing page, and so forth. Such prospect interactions are of the utmost importance to marketers who will later seek to analyze the effect of their marketing campaigns.

Unfortunately, there is presently no mechanism by which to centrally display and surface marketing activity data for customers utilizing both the Pardot automation platform as well as the CRM platform.

Problematically, due to sheer volume of data tracked by the Pardot automation platform, including the millions of tracked engagement activities by customers, it simply is not practical to copy, move, or relocate the Pardot data into the underlying data storage utilized by the CRM platform as doing so has a degradation effect upon the CRM platform's database and responsiveness of the CRM's GUI's, applications, and analytics due to the creation of so many additional records within the CRM's system at the scale which the CRM and Pardot automation platforms operate.

Similarly, it is not feasible or desirable to relocate, move, or copy the CRM databases into the underlying data storage utilized by the Pardot automation platform as doing so will degrade both the Pardot automation platform and the CRM platform, leading to an unsatisfactory customer experience by users of both platforms.

Notwithstanding these technical challenges, customers of the cloud computing platform have requested an intuitive and simple to use interface permitting users of the Pardot and CRM platforms to easily view related information regardless of which platform is being utilized.

The state of the art may therefore benefit from the systems, methods, and apparatuses for implementing cross cloud engagement activity visualization without requiring database merge or data replication within a cloud based computing environment, as described herein.

BRIEF DESCRIPTION OF THE DRAWINGS

Embodiments are illustrated by way of example, and not by way of limitation, and will be more fully understood with reference to the following detailed description when considered in connection with the figures in which:

FIG. 4 depicts another exemplary architecture depicting the data flows to the exemplary CRM contact detail Graphical User Interface (GUI) displaying both marketing engagement activities and the sales engagement activities, in accordance with described embodiments;

FIG. 6 depicts a flow diagram illustrating a method for implementing cross cloud engagement activity visualization without requiring database merge or data replication within a cloud based computing, in accordance with described embodiments;

DETAILED DESCRIPTION

Figure 1:
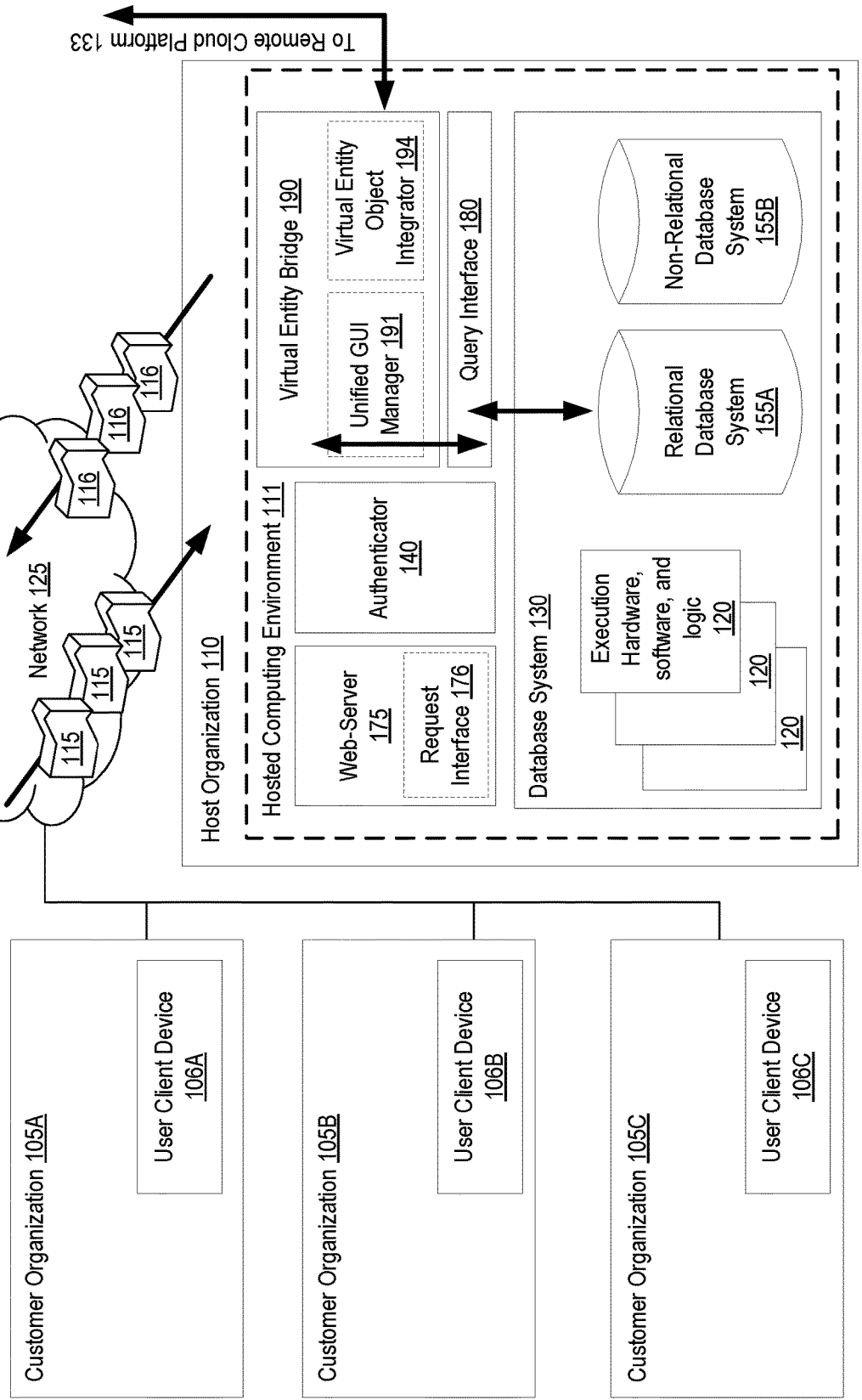
FIG. 1 depicts an exemplary architecture of a cloud computing environment in accordance with described embodiments.

Described herein are systems, methods, and apparatuses for implementing cross cloud engagement activity visualization without requiring database merge or data replication within a cloud based computing environment. For instance, an exemplary system includes: means for operating a database system communicably interfaced with the system of the host organization; means for operating a virtual entity bridge communicably interfacing the system with a remote cloud platform storing engagement activity data representing interactions of potential customers with a marketing campaign; means for generating a unified GUI to display a plurality of the CRM records at a user computing device; means for surfacing a plurality of related rows from the stored engagement activity data related to one of the plurality of CRM records by automatically querying the remote cloud platform via the virtual entity bridge for the plurality of related rows; means for populating the unified GUI with the surfaced plurality of rows; and means for transmitting the unified GUI to the user computing device for display.

In the following description, numerous specific details are set forth such as examples of specific systems, languages, components, etc., in order to provide a thorough understanding of the various embodiments. It will be apparent, however, to one skilled in the art that these specific details need not be employed to practice the embodiments disclosed herein. In other instances, well-known materials or methods are described in detail in order to avoid unnecessarily obscuring the disclosed embodiments.

In addition to various hardware components depicted in the figures and described herein, embodiments further include various operations that are described below. The operations described in accordance with such embodiments may be performed by hardware components or may be embodied in machine-executable instructions, which may be used to cause a general-purpose or special-purpose processor programmed with the instructions to perform the operations. Alternatively, the operations may be performed by a combination of hardware and software.

Embodiments also relate to an apparatus for performing the operations disclosed herein. This apparatus may be specially constructed for the required purposes, or it may be a general purpose computer selectively activated, configured, or reconfigured by a computer program stored in the computer. Such a computer program may be stored in a computer readable storage medium, such as, but not limited to, any type of disk including floppy disks, optical disks, CD-ROMs, and magnetic-optical disks, read-only memories (ROMs), random access memories (RAMs), EPROMs, EEPROMs, magnetic or optical cards, or any type of media suitable for storing electronic instructions, each coupled to a computer system bus.

The algorithms and displays presented herein are not inherently related to any particular computer or other apparatus. Various general purpose systems may be used with programs in accordance with the teachings herein, or it may prove convenient to construct a more specialized apparatus to perform the required method steps. The required structure for a variety of these systems appears as set forth in the description below. In addition, embodiments are not described with reference to any particular programming language. It will be appreciated that a variety of programming languages may be used to implement the teachings of the embodiments as described herein.

Embodiments may be provided as a computer program product, or software, that may include a machine-readable medium having stored thereon instructions, which may be used to program a computer system (or other programmable electronic devices) to perform a process according to the disclosed embodiments. A machine-readable medium includes any mechanism for storing or transmitting information in a form readable by a machine (e.g., a computer). For example, a machine-readable (e.g., computer-readable) medium includes a machine (e.g., a computer) readable storage medium (e.g., read only memory ("ROM"), random access memory ("RAM"), magnetic disk storage media, optical storage media, flash memory devices, etc.), a machine (e.g., computer) readable transmission medium (electrical, optical, acoustical), etc.

Any of the disclosed embodiments may be used alone or together with one another in any combination. Although various embodiments may have been partially motivated by deficiencies with conventional techniques and approaches, some of which are described or alluded to within the specification, the embodiments need not necessarily address or solve any of these deficiencies, but rather, may address only some of the deficiencies, address none of the deficiencies, or be directed toward different deficiencies and problems which are not directly discussed.

FIG. 1 depicts an exemplary architecture 100 of a cloud computing environment in accordance with described embodiments. In one embodiment, a hosted computing environment 111 is communicably interfaced with a plurality of user client devices 106A-C (e.g., such as mobile devices, smart phones, tablets, PCs, etc.) through host organization 110. In one embodiment, a database system 130 includes databases 155A and 155B, for example, to store application code, object data, tables, datasets, and underlying database records with user data on behalf of client, or customer, organizations 105A-C, and communities 160A-C (e.g., users of such a database system 130 or tenants of a multi-tenant database type database system or the affiliated users of such a database system). Such databases include various database system types including, for example, a relational database system 155A and a non-relational database system 155B according to certain embodiments.

Certain embodiments may utilize a client-server computing architecture to supplement features, functionality, or computing resources for the database system 130 or alternatively, a computing grid, or a pool of work servers, or some combination of hosted computing architectures may be utilized to carry out the computational workload and processing demanded of the host organization 110 in conjunction with the database system 130.

The exemplary database system 130 depicted here includes a plurality of underlying hardware, software, and logic elements 120 that implement database functionality and a code execution environment within the host organization 110.

In accordance with one embodiment, database system 130 utilizes the underlying database systems 155A and 155B to service database queries and other data interactions with the database system 130 that communicate with the database system 130 via the query interface. The hardware, software, and logic elements 120 of the database system 130 are separate and distinct from a plurality of customer organizations (105A, 105B, and 105C) which utilize web services and other service offerings as provided by the host organization 110 by communicably interfacing to the host organization 110 via network 125. In such a way, host organization 110 may implement on-demand services, on-demand database services or cloud computing services to subscribing customer organizations 105A-C.

Further depicted is the host organization 110 receiving input and other requests 115 from a plurality of customer organizations 105A-C via network 125 (such as a public Internet). For example, incoming search queries, database queries, API requests, interactions with displayed graphical user interfaces and displays at the user client devices 106A-C, or other inputs may be received from the customer organizations 105A-C to be processed against the database system 130, or such queries may be constructed from the inputs and other requests 115 for execution against the databases 155 or the query interface 180, pursuant to which results 116 are then returned to an originator or requestor, such as a user of one of the user client devices 106A-C at a respective customer organization 105A-C.

In one embodiment, each customer organization 105A-C is an entity selected from the group consisting of: a separate and distinct remote organization, an organizational group within the host organization 110, a business partner of the host organization 110, or a customer organization 105A-C that subscribes to cloud computing services provided by the host organization 110.

In one embodiment, requests 115 are received at, or submitted to, a web-server 175 within host organization 110. Host organization 110 may receive a variety of requests for processing by the host organization 110 and its database system 130. Incoming requests 115 received at web-server 175 may specify which services from the host organization 110 are to be provided, such as query requests, search request, status requests, database transactions, graphical user interface requests and interactions, processing requests to retrieve, update, or store data on behalf of one of the customer organizations 105A-C, code execution requests, and so forth. Web-server 175 may be responsible for receiving requests 115 from various customer organizations 105A-C via network 125 on behalf of the query interface 180 and for providing a web-based interface or other graphical displays to an end-user user client device 106A-C or machine originating such data requests 115.

The query interface 180 is capable of receiving and executing requested queries against the databases and storage components of the database system 130 so as to return a result set, response, or other requested data in furtherance of the methodologies described. The query interface 180 additionally provides functionality to pass queries from web-server 175 into the database system 130 for execution against the databases 155 for processing search queries, or into the other available data stores of the host organization's computing environment 111. In one embodiment, the query interface 180 implements an Application Programming Interface (API) through which queries may be executed against the databases 155 or the other data stores.

Host organization 110 may implement a request interface 176 via web-server 175 or as a stand-alone interface to receive requests packets or other requests 115 from the user client devices 106A-C. Request interface 176 further supports the return of response packets or other replies and responses 116 in an outgoing direction from host organization 110 to the user client devices 106A-C.

Authenticator 140 operates on behalf of the host organization to verify, authenticate, and otherwise credential users attempting to gain access to the host organization.

Still further depicted within the hosted computing environment 111 is the virtual entity bridge 190 having therein both a virtual entity object integrator 194 which operates to integrate data retrieved from another remote cloud platform 133 in furtherance of providing the requested data to a user as well as unified GUI manager 191 which generates and transmits a GUI to users have data represented therein from disparate sources, such as data and objects originating from within the host organization's 110 database system 130 along with information originating from a remote cloud platform 133.

For example, according to one embodiment, the authenticator validates a connected user based on the User ID of the user as is utilized by the host organization's 110 database system as well as a connected User ID of the same user which is utilized by the remote cloud platform 133 for the user. In such an embodiment, while the user may be the same person, the user ID at each of the host organization 110 and the remote cloud platform is likely a different user ID entirely.

According to a particular embodiment, the data retrieved via the virtual entity bridge 190 from the remote cloud platform 133 is provided by a cloud computing platform outside of the control of the host organization 110 whereas in other embodiments, the remote cloud platform 133 operates under the control of the host organization 110 yet is remotely located and utilizes separate and distinct authentication for queries and utilizes a separate and distinct user ID, even when such data is being requested on behalf of the same human user.

Figure 2A:
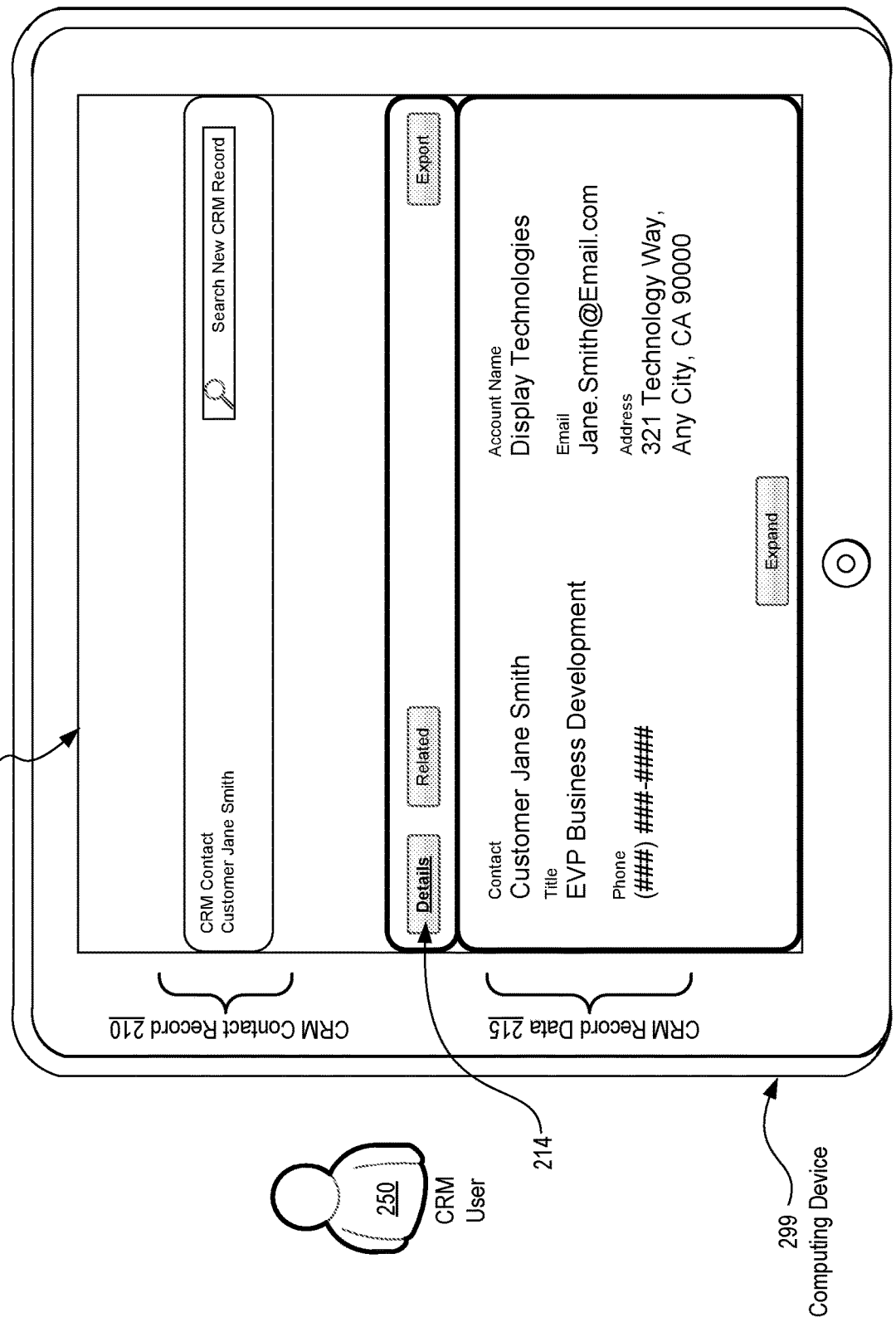
FIG. 2A depicts an exemplary Graphical User Interface (GUI) 220 displaying a CRM contact record, in accordance with described embodiments.

FIG. 2A depicts an exemplary Graphical User Interface (GUI) 220 displaying a CRM contact record, in accordance with described embodiments.

As is shown here, there is a CRM user 250 utilizing a computing device 299 to display a Graphical User Interface (GUI) 220 with various CRM data displayed to it. Specifically, there is a selected CRM contact record 210 for Jane Smith selected. Because the "details" tab 214 is selected, additional CRM record data 215 is presented on the lower pane of the GUI, including the email, phone number, title, address, account name, etc.

Notwithstanding the fact that the CRM GUI is being utilized, it may nevertheless be desirable to view various engagement activities which are associated with the CRM record for customer Jane smith, or alternatively, it may be of interest to display the engagement activities which are associated with a particular account.

Unfortunately, the engagement activities are not stored within the CRM database from which the CRM record is retrieved and moreover, it is not desirable to copy or replicate the engagement activities into the CRM database. Nevertheless, it is depicted here that by clicking on the "related" tab, it is possible to display the engagement activities which are associated with the CRM record for customer Jane Smith.

The engagement activities may be stored within the Pardot automation platform databases which may reside within a separate remote cloud platform. The separate remote cloud platform may even utilize a different authenticator and different user IDs for users of the separate system.

The Pardot automation platform provides a world-class B2B Marketing solution for customers of the host organization, tracking literally millions upon millions of engagement activities permitting customer organizations to track prospect interactions (e.g., the interactions of potential customers with marketing campaigns) so as to better understand the effectiveness of marketing campaigns. For example, it may be helpful to know when or if a prospect opens a marketing email, whether or not they visit a campaign landing page, as well as any further activities such as viewing, completing, or submitting a form, signing up for a web seminar, etc. These recorded engagement activities are important for marketers to analyze the effectiveness of their marketing campaigns.

According to the described embodiments, the marketing engagement activities are stored in a separate cloud platform, distinct from the cloud platform provided by the host organization. The host organization provides various GUIs and applications by which customer organizations may view CRM records and also view the marketing engagement activity data for marketing campaigns, however, practice of the described embodiments permits users to intuitively and seamlessly view both CRM data records and related marketing engagement activity details within an integrated and centralized view via the GUI 220.

The CRM platform is primarily a sales tool, whereas the Pardot automation platform is primarily a marketing tool.

Nevertheless, integrating the view of data from these two disparate systems permits customers of the host organization to maintain, view, and understand both sales and marketing data literally on the same page via the centralized view provided by GUI 220.

Such a unified user interface therefore provides sales and marketing teams with valuable insights into prospect activities as well as increasing the efficiency of related lead management processes. Such a centralized view, as provided by GUI 220, additionally eliminates the potential for obstacles within the sales funnel which may otherwise result in potential leads dropping out of the sales process entirely.

In the marketplace today, conventionally known solutions are provided by either CRM vendors which provide applications, interfaces, and databases for the handling and maintenance of CRM data records or alternatively, marketing tool vendors, which handle and track marketing campaigns.

Because Salesforce.com's cloud computing platform (e.g., the host organization 110) provides both CRM and marketing domain solutions, the host organization is uniquely situated to deliver an integrated solution and centralized view of CRM data and related records, including the marketing engagement activity data, to customers of the host organization. Unfortunately, because the underlying data associated with the respective CRM and marketing platforms are not stored together due to compatibility and scalability issues, there remain significant obstacles to delivering to customers a centralized view of both types of records in a seamless and intuitive manner.

Having both sales and marketing data available from a centralized and integrated view, as depicted here, improves collaboration amongst sales and marketing teams to make their work efficient as well as improving efficiency for any individual team member within either the sales or the marketing teams. However, as will be appreciated, the challenge of bringing together these CRM platform and Pardot marketing platform datasets is massive due to the enormous volume of marketing engagement activity data, generating tracked activity data well in excess of millions of rows per day. Such volumes are well beyond the CRM platform's data storage limits and architecture as those databases have been purpose built and tuned to solve a different problem entirely. The volume of the tracked marketing engagement activity data is the result of sales promotions and marketing campaigns commonly targeting different stages during the sales process, and therefore, the amount of responded activities result in magnitudes greater data rows having to be tracked by the Pardot automation marketing platform's underlying data storage, which is purpose built for this high-volume influx of data. For example, every prospect which is targeted by a marketing campaign may have associated rows of data specifying, for example, email consent, or a click event on a landing page, or a form view, or a form submission, or a web-page navigation event, etc. Moreover, many of these events may occur multiple times and they occur for many of the prospects that are targeted by the marketing campaign, resulting in very large volumes of data being generated, captured, and maintained by the marketing platform database.

While simply moving or replicating the marketing engagement activity data into the CRM database may be considered an obvious solution, when such attempts were made in practice, numerous problems presented themselves which ultimately rendered this seemly simple solution impractical. As motioned above, these problems include the issue of scale in which the marketing engagement activity data is so vast, that it literally does not fit into the underlying data storage architecture utilized for the CRM platform's databases. Additionally, when attempting to synchronize the millions and millions of records of marketing engagement activity data over to the CRM databases, there arose the additional issue of performing the synchronization with such a large dataset. Specifically, due to the vast quantity of records of marketing engagement activity data, the synchronization tool became overwhelmed and was unable to track which ones of the individual data records were successfully copied versus those which required re-attempts, ultimately requiring the entire process to be backed out and re-started multiple times, without ever successfully finishing. Further still, when a sub-set of the marketing engagement activity data was integrated into the CRM databases for testing purposes, the volume of data caused performance degradation to the CRM databases which was deemed an unacceptable result. Therefore, an alternative solution was sought out which does not require the moving, replication, copying, or synchronizing of the marketing engagement activity data into the CRM databases.

According to the described embodiments, the GUI 220 implements a solution which provides a unified and integrated customer experience permitting a user to view both CRM platform data records and Pardot marketing platform marketing engagement activity data within the same application or GUI, without actually unifying the underlying data records themselves. Stated differently, the CRM platform data records and the marketing engagement activity data remain not only within separate and distinct databases, but actually reside within different cloud platforms in accordance with certain embodiments. For instance, the CRM platform data records may be stored by a database within the host organization while the marketing engagement activity data for the Pardot marketing platform are stored within a database operated by a remote cloud platform separate from the host organization.

Figure 2B:
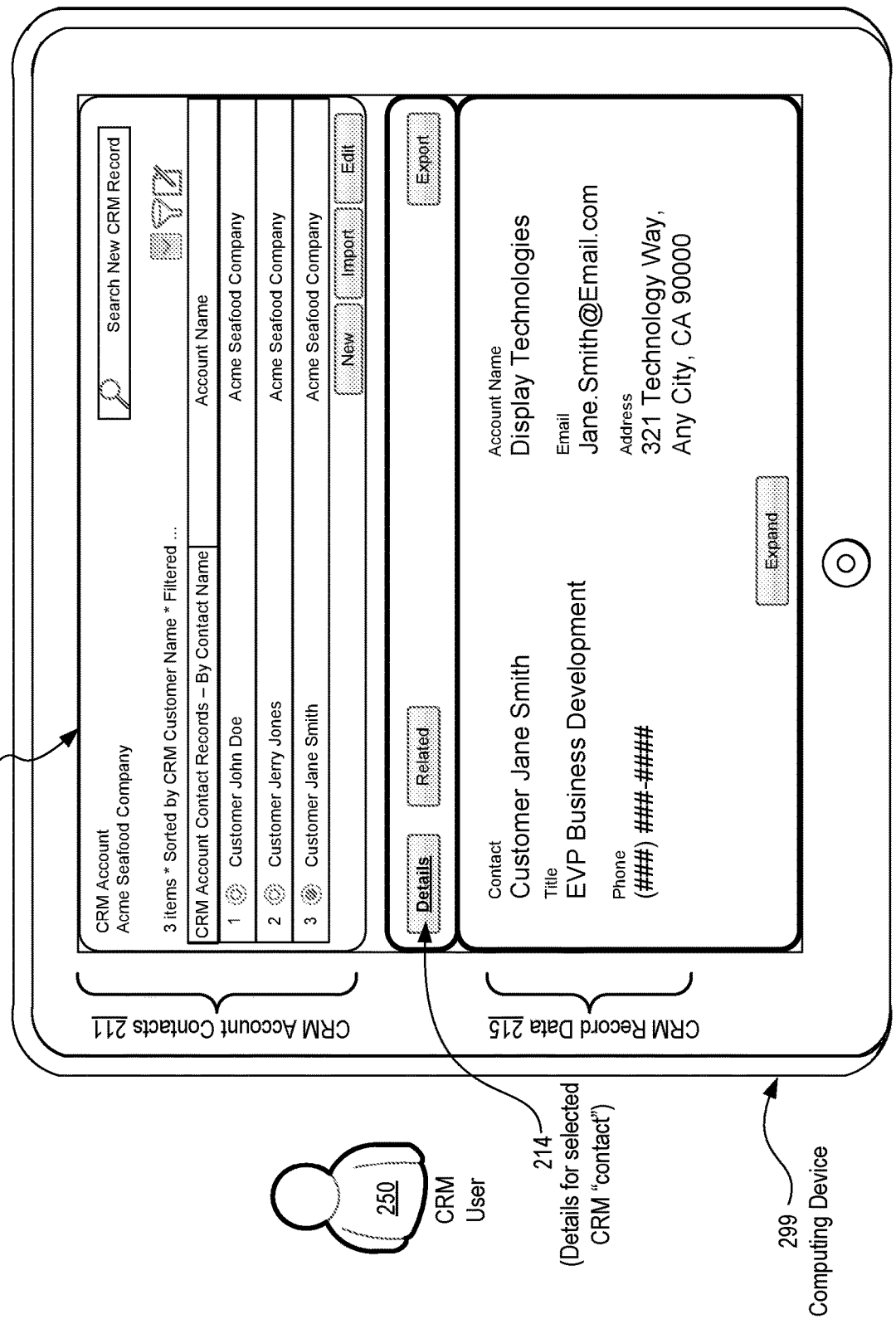
FIG. 2B depicts another exemplary Graphical User Interface (GUI) 220 displaying a CRM "Account" record having multiple account "contacts," in accordance with described embodiments.

FIG. 2B depicts another exemplary Graphical User Interface (GUI) 220 displaying a CRM "Account" record having multiple account "contacts," in accordance with described embodiments.

As depicted here, there are CRM account contact 211 details now shown via the upper pane of the GUI 220, in which the CRM user 250 has searched for the CRM account "Acme Seafood Company," to reveal multiple CRM account contacts 211, including the three contacts John Doe, Jerry Jones, and Jane Smith, all of whom are associated with the CRM account "Acme Seafood Company."

In this particular depiction, the CRM user 250 has selected customer "Jane Smith" from the available CRM account contacts 211 pane, which then reveals the "details" tab 214 showing additional details for the selected CRM contact (which is presently selected) and additionally revealing the "Related" tab, which is not presently selected.

Figure 2C:
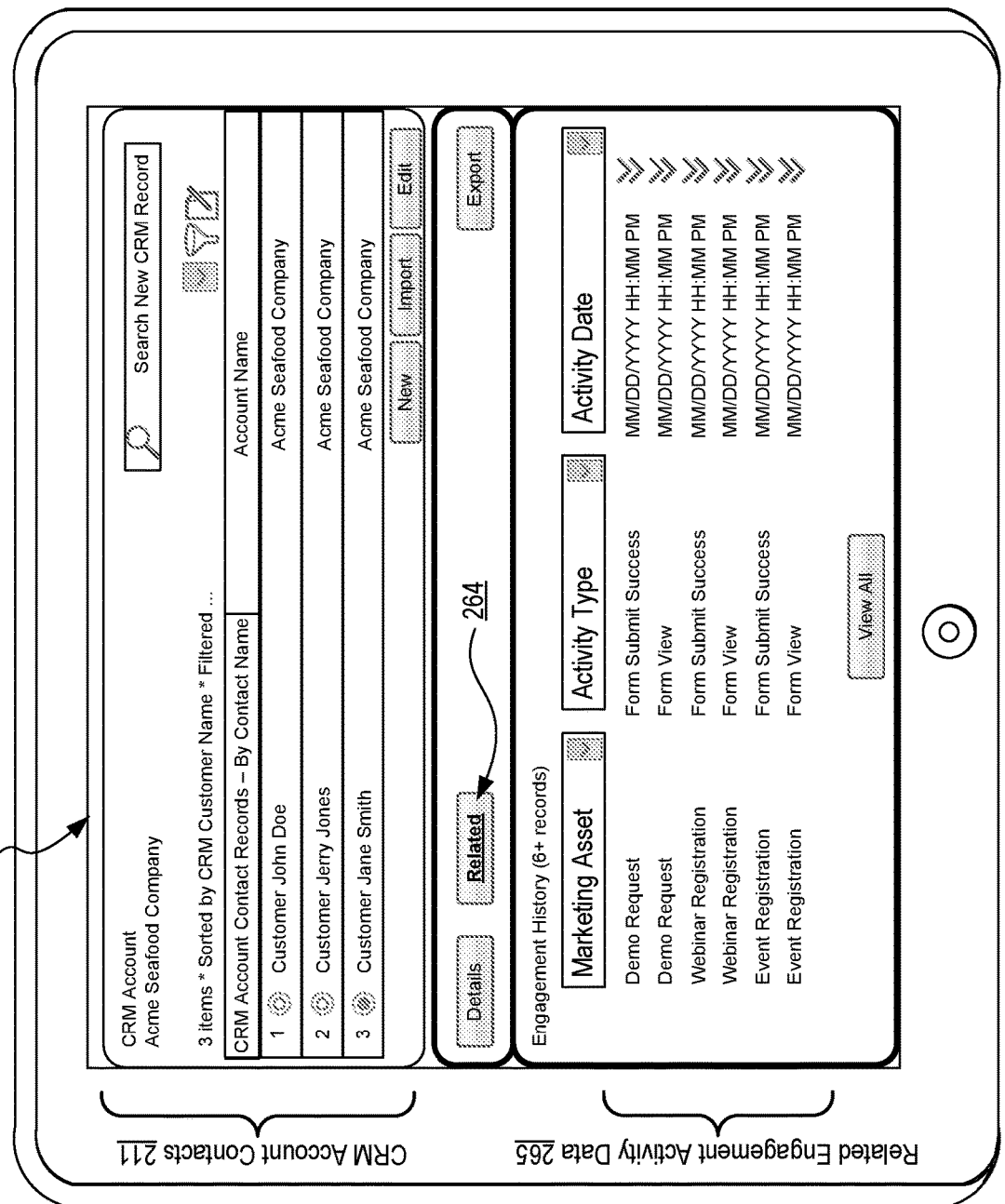
FIG. 2C depicts another exemplary Graphical User Interface (GUI) displaying CRM records and additionally displaying related marketing engagement activity data retrieved from a remote cloud platform, in accordance with described embodiments.

FIG. 2C depicts another exemplary Graphical User Interface (GUI) 220 displaying CRM records and additionally displaying related marketing engagement activity data retrieved from a remote cloud platform, in accordance with described embodiments.

Regardless of whether the CRM user 250 reveals the "related" details from a CRM contact record 210 as depicted at FIG. 2A or by selecting one of several CRM contacts from a CRM account contacts 211 list as depicted at FIG. 2B, selecting the "related" tab 264 for a given CRM contact record will reveal the additional related marketing engagement activity data for that particular CRM contact.

For instance, as is depicted here, there is again a CRM user 250 utilizing a computing device 299 to display a Graphical User Interface (GUI) 220 with various CRM data displayed to it. Specifically, there is a selected CRM record for Jane Smith selected within the available CRM contact record 210. However, because the "related" tab 264 is selected, rather than depicting additional CRM record data 215 as was the case with the prior GUI display, there is now depicted the related engagement activity data 265 which is pulled at runtime via a query to a separate and distinct cloud platform via the Virtual Entity Bridge 190 (see FIG. 1) with the related engagement activity data 265 then being depicted on the lower pane of the GUI 220. For example, displayed here are 6+ engagement history records including demo requests, Webinar registrations, and event registrations, each being associated with an activity type and an activity date. The user may click the chevrons to expand any displayed record, or click the "view all" button to display additional records of the engagement history, or click any of the column headers to sort or filter by that column.

Figure 3A:
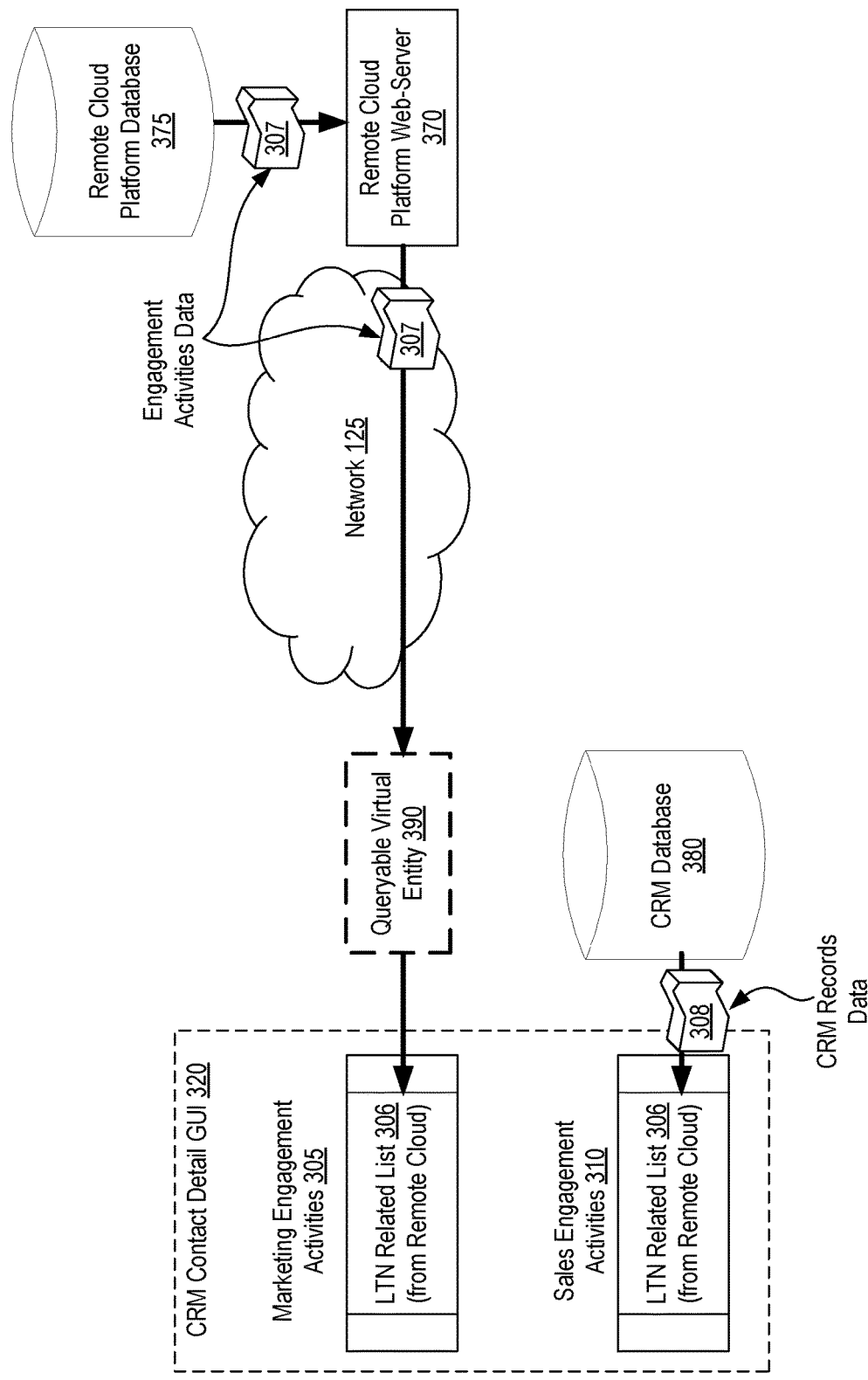
FIG. 3A depicts the source of each of the marketing engagement activities data and the sales engagement activities data, in accordance with described embodiments.

FIG. 3A depicts the source of each of the marketing engagement activities data and the sales engagement activities data, in accordance with described embodiments.

In this simplified view, it may be observed that the engagement activities data 307 which is ultimately displayed to the CRM contact detail GUI 320 as the marketing engagement activities 305 (e.g., within the LTN related list 306) originates from the remote cloud platform database 375, with the engagement activities data 307 being passed through the remote cloud platform web-server 370 which authenticates incoming queries and then fetches the requested data from the remote cloud platform database 375 and responsively returns the engagement activities data 307 via the network 125 (e.g., a WAN or a public Internet) to the queryable virtual entity at the host organization for display to the CRM contact detail GUI 320. The sales engagement activities 310 are also displayed to the CRM contact detail GUI 320, however, the CRM records data 308 which is displayed originates from the CRM database 380 which is operated and hosted locally by the host organization 110. Thus, the CRM database 380 returns the requested CRM records data for display to the CRM contact detail GUI 320 responsive to a local query.

While a normal "entity" represents a locally stored queryable object, with the data being persisted locally by the host organization 110, a queryable virtual object does not itself have any data. While the virtual object may still be queried, the requested engagement activities data must be retrieved from the remote cloud platform 133. Nevertheless, it is beneficial to represent the remotely stored data as locally accessible to applications executing at the host organization 110 so as to simplify data access logic from those applications and to further permit the virtual objects representing the remotely stored data to be browsed, viewed, and referenced by application builder functionality and workflow builder functionality provided by the host organization. Stated differently, the virtual entity bridge 190 of the host organization deals with the complexity of accessing the remotely stored data on behalf of administrators and application developers so as to simplify application development within the host organization 110.

According to the described embodiments, a locally executing application or GUI interface may perform a local query to the queryable virtual entity which is a defined object within the host organization, however, the queryable virtual entity 390 does not include any data. Rather, when the queryable virtual entity 390 is queried, the virtual entity bridge 190 (see FIG. 1) generates a new query to the remote cloud platform web-server 370 requesting the required data. According to such embodiments, this occurs at run-time when the CRM contact detail GUI 320 is displayed to a user computing device.

Figure 3B:
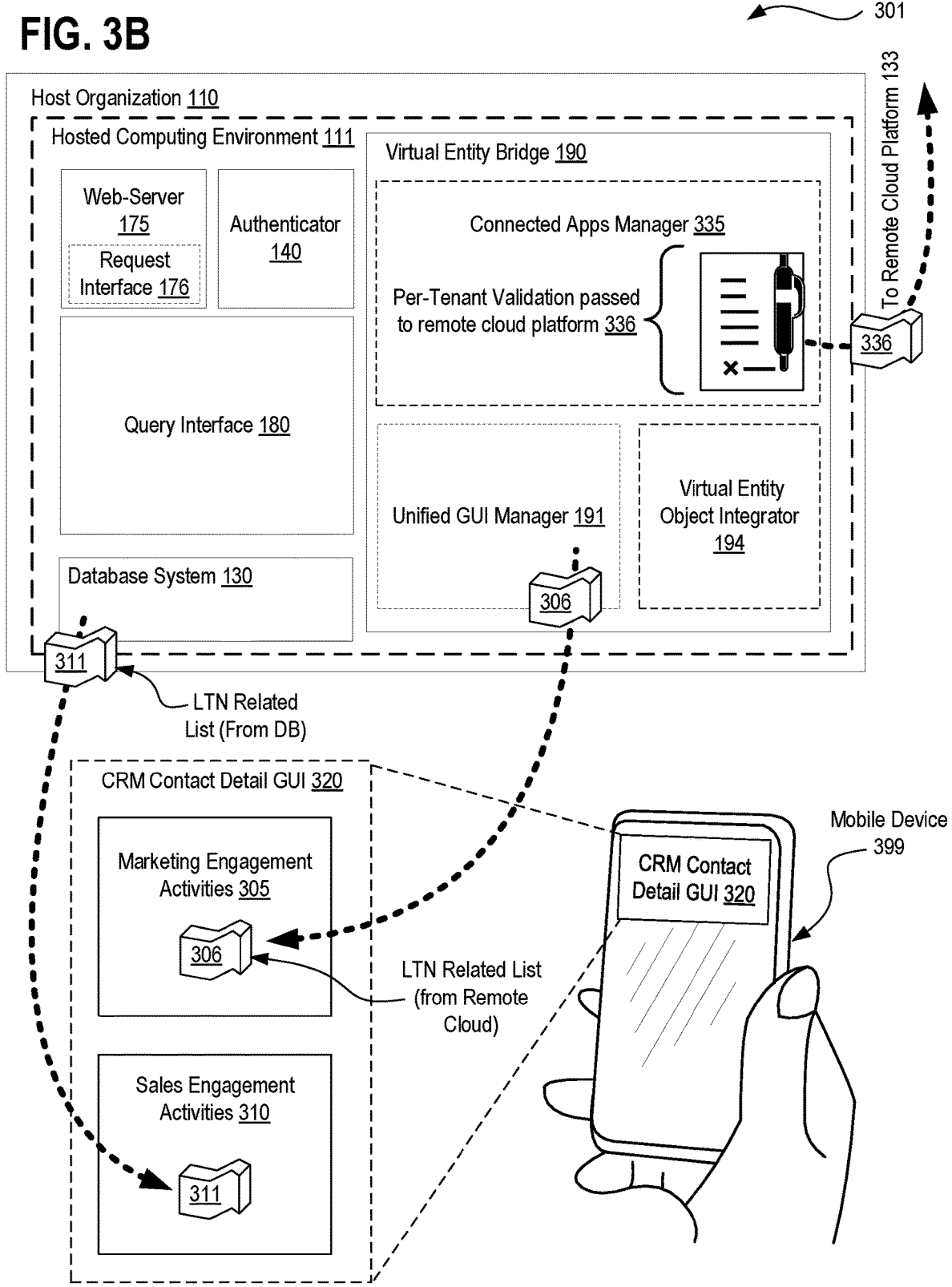
FIG. 3B depicts data flows to the exemplary CRM contact detail Graphical User Interface (GUI) displaying both marketing engagement activities and sales engagement activities, in accordance with described embodiments.

FIG. 3B depicts data flows 301 to the exemplary CRM contact detail Graphical User Interface (GUI) 320 displaying both marketing engagement activities 305 and sales engagement activities 310, in accordance with described embodiments.

As depicted here, there is again the host organization 110 having therein the virtual entity bridge 190 which communicatively interfaces with the remote cloud platform 133 from which the Pardot marketing platform marketing engagement activity data may be retrieved via a query at runtime.

However, the virtual entity bridge 190 now depicts additional detail and data flows. Specifically, the connected apps manager 335 provides per-tenant validation 336 which is passed to the remote cloud platform 133. The remote cloud platform will utilize the per-tenant validation credentials to verify that the query for marketing platform marketing engagement activity data from the host organization's virtual entity bridge 190 is valid.

The remote cloud platform 133 will return the marketing engagement activities 305 via a Long Term Nurturing (LTN) related list which is displayed within the CRM contact detail GUI 320 as described above with regard to FIGS. 2A and 2B, permitting the selection of a CRM customer record and then the further display of additional detail for that CRM customer record or the display within the same GUI of related marketing platform marketing engagement activity data. Notably, marketing engagement activity data 305 provided via the LTN related list 306 originates from the remote cloud platform and is not stored or persisted by the host organization 110. Conversely, the sales engagement activity data 310 (e.g., CRM customer record data) provided via the LTN related list 311 originates from the database systems 130 of the host organization 110.

The unified GUI manager 191 receives the related marketing platform marketing engagement activity data as a virtual object passed from the virtual entity object integrator 194 and generates a unified display which is then transmitted to the CRM contact detail GUI 320 for display to the user via the user's mobile device 399 or other computing device capable of displaying the GUI 320.

According to certain embodiments, the component within which the engagement activities data is to be displayed will fire off the query to the remote cloud platform at the time the GUI loads, even if the user has not yet clicked on the "related" tab to load the additional related engagement activities data. In such a way, the data is nearly certain to be loaded and populated within the "related" 264 tab by the time the user of the GUI clicks or navigates within the GUI to view that related 264 engagement activities data, despite such data being pulled from a remote source.

FIG. 4 depicts another exemplary architecture depicting the data flows to the exemplary CRM contact detail Graphical User Interface (GUI) 320 displaying both marketing engagement activities 406 and the sales engagement activities 411, in accordance with described embodiments.

As may be observed here, the virtual entity bridge 190 is shown passing a run-time query 456 to the remote query interface 480 of the remote cloud platform 444 which responsively returns the marketing engagement activity data 456 from the marketing database 455 of the remote cloud platform 444 to the virtual entity object integrator 194 via the network 125 (e.g., a public Internet).

Additionally depicted is a queryable virtual entity object 457 which is locally stored by the database system 130 of the host organization 110 and may thus be queried as a native locally stored object by any application executing at the host organization 110, including the unified GUI manager 191 which generates and transmits the unified CRM contact detail GUI 320 to the user device for display. However, the queryable virtual entity 457 is void of any marketing platform engagement activity data and thus, such data must be retrieved from the remote cloud platform 444 responsive to any received query at the queryable virtual entity 457.

Further depicted is the virtual entity object integrator 194 passing the related marketing platform engagement activity data 406 for display to the CRM contact detail GUI 320 listing the marketing engagement activities 305 and similarly, the database 130 passes the CRM records data 411 to the CRM contact detail GUI 320 for display via the sales engagement activities 310.

As is depicted here, the related list 406 having the marketing platform engagement activities data is displayed to a user computing device via the CRM contact detail GUI 320 with the same look and feel as a Sales engagement activities 310 view that is commonly attached to a CRM Account. For instance, the depicted LTN related list 406 from the remote cloud platform may include, for example, Contact/Lead, or a Marketing Asset such as a landing page, a marketing form, etc. When a user of the host organization displays the detailed page of an Account/Contact/Lead/Asset from the CRM database, the user may click on the "related" list (e.g., see element 264 of FIG. 2B) to show the associated prospects' interactions under that particular CRM object. Stated differently, where a CRM object identifies an account, contact, lead, or other Asset from the locally available CRM database, the associated or "related" information may be pulled from the remotely located marketing platform database to display marketing engagement activity data for that account, contact, lead, or other Asset. In such a way, the related list provides a standard way for users to browse, sort, filter row based data such as marketing platform engagement activities.

According to described embodiments, the host organization executes the unified GUI manager 191 to power the related list, out of view from the users so as to provide a seamless and intuitive unified GUI experience, notwithstanding the fact that the data being displayed to the user's computing device via the unified GUI originates from both local and non-local sources.

Normally data shown in a related list originates from the local CRM database, however, because the engagement activities data is not stored locally, it must be retrieved from the remote cloud platform and then populated into the queryable virtual entity object at runtime via which to then populate the related list displayed to the GUI.

The queryable virtual entity 457 operates in conjunction with the virtual entity bridge 190 to facilitate this data transfer from the remote cloud platform and runtime of the unified GUI manager 191 responsive to a user attempting to view the unified GUI. The queryable virtual entity 457 is a special type of salesforce entity, whose actual data for the entity originates from an external source, remote from the host organization. According to certain embodiments, such external data originates from the Pardot automation marketing cloud platform which stores and manages the engagement activities data for sales prospects on behalf of customer organizations. However, the engagement activities data may be retrieved from other marketing platforms so long as they permit the remote retrieval of such data.

The virtual entity bridge enables the related list to be displayed, browsed, sorted, filtered, and paginated by retrieving the engagement activities data pursuant to diversified criteria submitted by the CRM contact detail GUI 320, with each navigation, browse, sort, filtering and pagination event at the CRM contact detail GUI 320 triggering yet another runtime query to the queryable virtual entity object 457 which then in turn fetches additional data from the remote cloud platform utilizing the new query criteria from the user's interactions and behavior with the CRM contact detail GUI 320.

For example, responsive to user interactions with the CRM contact detail GUI 320, the UI logic of the GUI 320 will submit a new query with modifying criteria such as ordering by a certain column, filtering by a certain field, or fetching a certain page of all matching engagement activities data. In support of such functionality, the remote query interface 480 of the remote cloud platform 444 may implement an API to retrieve data by those submitted criteria from the host organization.

According to certain embodiments, the remote cloud platform's marketing database 455 is multi-tenant, and thus, it is further necessary to not only request specific data, but to request certain data limited by a particular "tenant" of the marketing database 455. For example, the requested data may be limited on the basis of the host organization's customer organization from which the CRM contact detail GUI 320 generates and transmits a request. Thus, if a user of a host organization is browsing related engagement activities data, then the customer organization is determinable based on that user's association with and permissions to browse such data. However, the corresponding tenant at the remote cloud platform's 444 marketing database 455 also needs to be identified.

According to particular embodiments, a "related apps" list is maintained by the remote cloud platform which lists the unified GUI manager 191 application as a "related app" with permission to query the engagement activities data from the remote cloud platform. According to certain embodiments, the OrgID associated with a user of the unified GUI manager 191 is passed from the host organization to the remote cloud platform and the OrgID is then cross-referenced at the remote cloud platform utilizing the related apps list to identify the corresponding tenant within the remote cloud platform. The corresponding tenant's ID is then utilized at the remote cloud platform to limit the query to only data associated with or stored on behalf of that particular tenant's ID. Thus, a tenant, such as General Motors, can query for data but the authentication mechanism of the remote cloud platform cross references the OrgID for General Motors at the host organization 110 to the corresponding tenant ID for General Motors at the remote cloud platform, which is then utilized to restrict the data query to only data associated with General Motors. In such a way, "Customer A" cannot inadvertently or impermissibly access the data of "Customer B" even when querying across clouds via the virtual entity bridge 190 to the remote cloud computing platform because the remote cloud computing platform will validate that the query originator at the host organization is a permissible connected app and because further the remote cloud platform will take the OrgID passed from the host organization and cross-reference that to a valid tenant at the remote cloud platform which is then utilized to restrict the query to only data permissibly viewable by the matching OrgID/Tenant of the host organization and remote cloud platform respectively.

According to related embodiments, the OrgID or Tenant ID is further utilized to determine which database slice or shard at the remote cloud platform is storing the data and then the query is further restricted to only that determined database slice or shard so as to further improve the response time of the query. According to another embodiment, there may be a table or listing as part of the connected apps list which identifies particular UserIDs as belonging to or associated with either Customer Organizations (OrgIDs) from the host organization or belonging to or being associated with tenant IDs at the remote cloud platform, or in certain instances, both the OrgID for the host organization and the Tenant ID for the remote cloud platform is listed for every UserID having some permissions to originate queries seeking to view the engagement activities data from the remote marketing cloud platform.

According to particular embodiments, fetching the correct engagement activities data from the remote cloud platform includes identified the correct slice or shard of the database from which to retrieve the requested engagement activities data based on the location of a corresponding tenant's data within the remote cloud platform 444. Stated differently, the customer organization or "tenant" of the host organization 110 needs to be cross-referenced with the corresponding "tenant" of the remote cloud platform, from which it is then determinable which data slice or database shard houses that particular tenant's data within the remote cloud platform.

According to particular embodiments, the data retrieval must occur very quickly notwithstanding the fact that the data is being retrieved from a remote source. For example, because the data is being displayed to a unified CRM contact detail GUI 320, it is important that users of the GUI do not perceive any noticeable latency or lag when the data displays to the GUI 320. Therefore, in order to fetch the data efficiently, a query plan is tuned to reduce the total time for retrieval of the remote data. For example, an index may be pre-built and then referenced so as to improve data retrieval speeds. In other embodiments, an order of table JOIN operations are modified to improve data retrieval time.

In other embodiments, the data is structured as a graph, with relationships between, for example, prospect IDs, leads, contacts, marketing campaigns, company, etc. These elements originate from different tables, however, based on the relationships between them, the columns of data from these different tables may be joined into a virtual table, which is then queried so as to reduce the total query time required as the data for many queries may then be retrieved from only the virtual table rather than having to fetch the data from multiple tables based on the relationships between them. Where only a subset of the engagement activity data is displayed to the unified CRM contact detail GUI 320, it is possible to pre-join some of these data elements into a virtual table which is then more likely to contain the required data responsive to an incoming query at the remote cloud platform's database.

Figure 5:
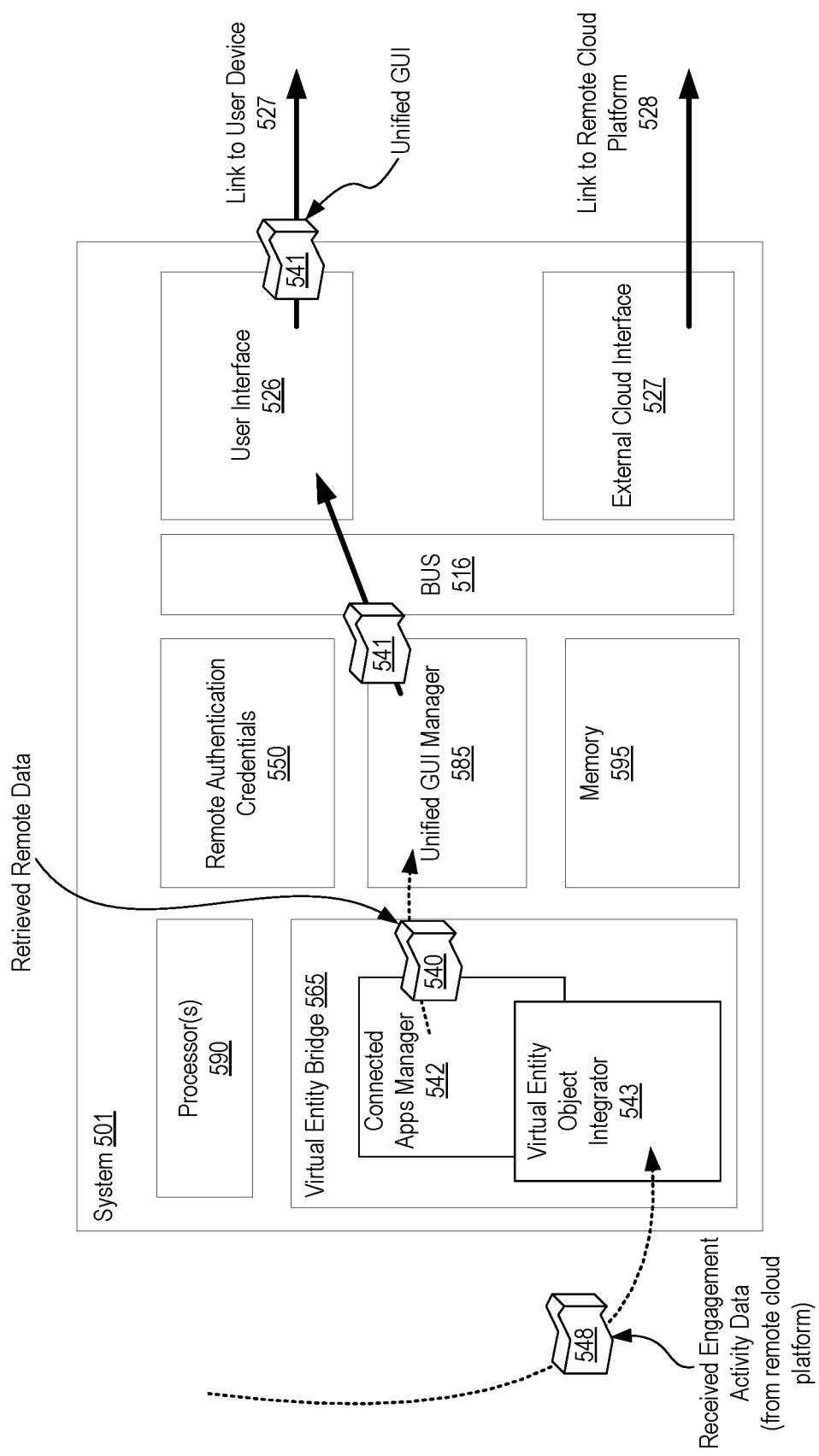
FIG. 5 shows a diagrammatic representation of a system within which embodiments may operate, be installed, integrated, or configured in accordance with described embodiments.

FIG. 5 shows a diagrammatic representation of a system 501 within which embodiments may operate, be installed, integrated, or configured.

According to the depicted embodiment, the system 501, which may operate within a host organization, includes the processor 590 and the memory 595 to execute instructions at the system 501. According to such an embodiment, the system 501 further includes: a virtual entity bridge 565 which includes a virtual entity object integrator 543 to receive engagement activity data 548 from a remote cloud platform. Further included within the virtual entity bridge 565 is connected apps manager 542 which passes the retrieved remote data over to the unified GUI manager 585 for integration with locally retrieved CRM data from the host organization's local database system.

According to another embodiment of the system 501, a user interface 526 transmits a unified GUI 541 to a user computing device 527 for display and to capture user interactions with the GUI via which to display CRM data records as well as related details specifying engagement activities data history which is retrieved from a remote cloud platform via the external cloud interface 527 which operates in conjunction with the virtual entity bridge 565 to link to the remote cloud platform 528. For example, the external cloud interface 527 links the system 501 via a communications link to the remote cloud platform over a public Internet or WAN.

Such a system may reside within a host organization which operates as a cloud-based service provider to the user client device; in which the cloud-based service receives inputs from the client device at the user interface 526 to retrieve the remote data 540 from the remote cloud platform and integrate the retrieved remote data 540 into a unified GUI with locally retrieved CRM data.

Bus 516 interfaces the various components of the system 501 amongst each other, with any other peripheral(s) of the system 501, and with external components such as external network elements, other machines, client devices, cloud computing services, etc. Communications may further include communicating with external devices via a network interface over a LAN, WAN, or the public Internet.

For example, according to another embodiment of the system 501, external cloud interface 527 may link to a remote cloud platform outside of the control of the host organization, such as linking to an Amazon Web Services (AWS) public computing cloud accessible to the virtual entity bridge 565 via the external cloud interface 527. Similarly, the retrieved remote data may be queried for and retrieved from, by way of example, a Microsoft Azure public computing cloud accessible to the external cloud interface 527; an AWS Direct Connect privately leased computing space accessible to the external cloud interface 527; and an Azure ExpressRoute privately leased computing space accessible to the external cloud interface 527, etc.

According to another embodiment, the system 501 further includes: a multi-tenant database system having customer data stored therein for a plurality of distinct customer organizations; in which each customer organization is an entity selected from the group consisting of: a separate and distinct remote organization, an organizational group within the host organization, a business partner of the host organization, or a customer organization that subscribes to cloud computing services provided by the host organization; in which the system operates at a host organization as a cloud-based service provider to the plurality of distinct customer organizations; and in which the cloud-based service provider receives inputs from the plurality of distinct customer organizations to schedule workload tasks for execution the plurality of computing resources.

According to a particular embodiment, there is a system 501 which is to execute at a host organization, in which the system 501 includes at least: a memory to store instructions; a processor to execute instructions; and wherein the system is configurable to execute the instructions via the processor to carry out operations including: operating a database system communicably interfaced with the system of the host organization, wherein the database system stores Customer Relationship Management (CRM) records on behalf of a plurality of customer organizations which subscribe to cloud computing services from the host organization; executing instructions via the processor of the system for operating a virtual entity bridge at the host organization communicably interfacing the system with a remote cloud platform storing engagement activity data representing interactions of potential customers with a marketing campaign by one of the plurality of host organizations; generating a unified Graphical User Interface (GUI) to display a plurality of the CRM records at a user computing device; surfacing a plurality of related rows from the stored engagement activity data related to one of the plurality of CRM records by automatically querying the remote cloud platform via the virtual entity bridge for the plurality of related rows; populating the unified GUI with the surfaced plurality of rows; and transmitting the unified GUI to the user computing device for display, wherein the unified GUI displays the plurality of the CRM records at the user computing device and responsively displays the surfaced plurality of rows at the user computing device responsive to a selection of one of the plurality of the CRM records via the unified GUI displayed to the user computing device.

FIG. 6 depicts a flow diagram illustrating a method 600 for implementing cross cloud engagement activity visualization without requiring database merge or data replication within a cloud based computing environment such as a database system implementation supported by a processor and a memory to execute such functionality to provide cloud based on-demand functionality to users, customers, and subscribers.

Method 600 may be performed by processing logic that may include hardware (e.g., circuitry, dedicated logic, programmable logic, microcode, etc.), software (e.g., instructions run on a processing device) to perform various operations such as operating, defining, declaring, associating, writing, receiving, retrieving, adding, transacting, training, distributing, processing, transmitting, analyzing, triggering, pushing, recommending, parsing, persisting, exposing, loading, generating, storing, maintaining, creating, returning, presenting, interfacing, communicating, querying, providing, determining, displaying, updating, sending, etc., in pursuance of the systems and methods as described herein. For example, the hosted computing environment 61, the blockchain services interface 650, and its database system 130 as depicted at FIG. 1, et seq., and other systems and components as described herein may implement the described methodologies. Some of the blocks and/or operations listed below are optional in accordance with certain embodiments. The numbering of the blocks presented is for the sake of clarity and is not intended to prescribe an order of operations in which the various blocks must occur.

With reference to the method 600 depicted at FIG. 6, there is a method for implementing cross cloud engagement activity visualization without requiring database merge or data replication within a cloud based computing environment, by performing the following operations:

Processing logic at block 605 operates a database system communicably interfaced with the system of the host organization, wherein the database system stores Customer Relationship Management (CRM) records on behalf of a plurality of customer organizations which subscribe to cloud computing services from the host organization.

Processing logic at block 610 executes instructions via the processor of the system for operating a virtual entity bridge at the host organization communicably interfacing the system with a remote cloud platform storing engagement activity data representing interactions of potential customers with a marketing campaign by one of the plurality of host organizations.

Processing logic at block 615 generates a unified Graphical User Interface (GUI) to display a plurality of the CRM records at a user computing device.

Processing logic at block 620 surfaces a plurality of related rows from the stored engagement activity data related to one of the plurality of CRM records by automatically querying the remote cloud platform via the virtual entity bridge for the plurality of related rows.

Processing logic at block 625 populates the unified GUI with the surfaced plurality of rows.

And processing logic at block 630 transmits the unified GUI to the user computing device for display, wherein the unified GUI displays the plurality of the CRM records at the user computing device and responsively displays the surfaced plurality of rows at the user computing device responsive to a selection of one of the plurality of the CRM records via the unified GUI displayed to the user computing device.

According to another embodiment, method 600 further includes: authenticating with the remote cloud platform based on remote authentication credentials 550 by passing a UserID uniquely identifying a user having previously authenticated with the host organization via the user computing device and an OrgID uniquely identifying the customer organization of the host organization with whom the UserID is associated.

According to another embodiment, method 600 further includes: maintaining a related apps list defining a list of applications having the authorization to query for the engagement activity data stored at the remote cloud platform; maintaining a users list correlating User IDs and OrgIDs managed by the host organization with tenant IDs managed by the remote cloud platform; and in which any query from the host organization for the engagement activity data stored at the remote cloud platform is restricted to accessing only data associated with a single tenant ID managed by the remote cloud platform based on the users list.

According to another embodiment, method 600 further includes: passing a UserID or OrgID, or both, from the host organization to the remote cloud platform with the automatic query to the remote cloud platform via the virtual entity bridge; in which the remote cloud platform identifies a single database slice or a single database shard having the requested plurality of related rows representing the interactions of potential customers with the marketing campaign by one of the plurality of host organizations based on the UserID or the OrgID passed with the automatic query; and in which the remote cloud platform retrieves the requested plurality of related rows from a marketing database system operated by the remote cloud platform by issuing a query restricted to only the identified single database slice or the identified single database shard.

According to another embodiment of method 600, the engagement activity data representing interactions of potential customers with a marketing campaign by one of the plurality of host organizations tracks one or more of: interactions with a marketing campaign landing page linked to a specific contact stored within the plurality of CRM records; viewing or opening of an email originating a marketing campaign by one of the customer organizations linked to a specific sales lead record or a sales contact record; and viewing or submission of a form associated with the marketing campaign by one of the customer organizations linked to a specific sales lead record or a sales contact record.

According to another embodiment of method 600, the remote cloud platform executes a public "REpresentational State Transfer" ("REST") API to receive the automatic query from the host organization over a public Internet.

According to another embodiment, method 600 further includes: storing a queryable virtual entity for the stored engagement activity data within the database system of the host organization, in which the queryable virtual entity is void of any of the stored engagement activity data; and in which automatically querying the remote cloud platform via the virtual entity bridge for the plurality of related rows includes issuing a query to the queryable virtual entity within the database system of the host organization; and in which the virtual entity bridge forwards the query to the public REST API of the remote cloud platform requesting the plurality of related rows from the remote cloud platform; and returning the plurality of related rows to an originating application having issued the query to the queryable virtual entity within the database system of the host organization.

According to another embodiment of method 600, the remote cloud platform operates a multi-tenant database system for persistently storing the engagement activity data.

According to another embodiment of method 600, the remote cloud platform implements a Pardot marketing automation platform providing marketing campaign analytics and tracking of the engagement activity data stored by the remote cloud platform.

According to another embodiment of method 600, the remote cloud platform persistently stores the engagement activity data via one of: an Amazon Web Services (AWS) public computing cloud accessible to the virtual entity bridge of the host organization; an AWS Direct Connect privately leased computing cloud accessible to the virtual entity bridge of the host organization; a Microsoft Azure public computing cloud accessible to the virtual entity bridge of the host organization; and an Azure ExpressRoute privately leased computing cloud accessible to the virtual entity bridge of the host organization.

According to a particular embodiment, there is a non-transitory computer readable storage media having instructions stored there upon that, when executed by a system of a host organization having at least a processor and a memory therein, the instructions cause the system to perform operations including: operating a database system communicably interfaced with the system of the host organization, in which the database system stores Customer Relationship Management (CRM) records on behalf of a plurality of customer organizations which subscribe to cloud computing services from the host organization; executing instructions via the processor of the system for operating a virtual entity bridge at the host organization communicably interfacing the system with a remote cloud platform storing engagement activity data representing interactions of potential customers with a marketing campaign by one of the plurality of host organizations; generating a unified Graphical User Interface (GUI) to display a plurality of the CRM records at a user computing device; surfacing a plurality of related rows from the stored engagement activity data related to one of the plurality of CRM records by automatically querying the remote cloud platform via the virtual entity bridge for the plurality of related rows; populating the unified GUI with the surfaced plurality of rows; and transmitting the unified GUI to the user computing device for display, in which the unified GUI displays the plurality of the CRM records at the user computing device and responsively displays the surfaced plurality of rows at the user computing device responsive to a selection of one of the plurality of the CRM records via the unified GUI displayed to the user computing device.

Figure 7A:
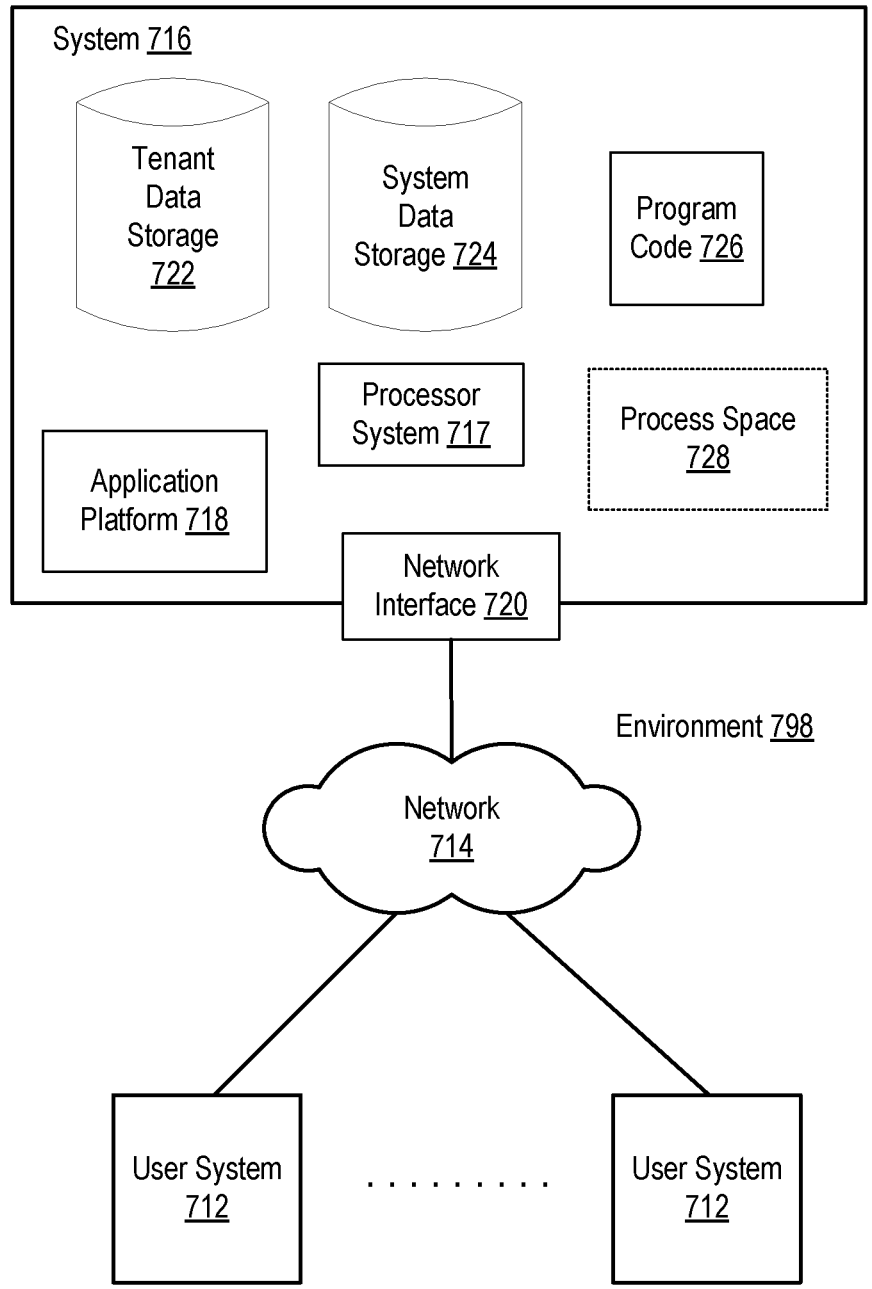
FIG. 7A illustrates a block diagram of an environment in which an on-demand database service may operate, in accordance with described embodiments.

FIG. 7A illustrates a block diagram of an environment 798 in which an on-demand database service may operate in accordance with the described embodiments. Environment 798 may include user systems 712, network 714, system 716, processor system 717, application platform 718, network interface 720, tenant data storage 722, system data storage 724, program code 726, and process space 728. In other embodiments, environment 798 may not have all of the components listed and/or may have other elements instead of, or in addition to, those listed above.

Environment 798 is an environment in which an on-demand database service exists. User system 712 may be any machine or system that is used by a user to access a database user system. For example, any of user systems 712 can be a handheld computing device, a mobile phone, a laptop computer, a work station, and/or a network of computing devices. As illustrated in FIG. 7A (and in more detail in FIG. 7B) user systems 712 might interact via a network 714 with an on-demand database service, which is system 716.

An on-demand database service, such as system 716, is a database system that is made available to outside users that do not need to necessarily be concerned with building and/or maintaining the database system, but instead may be available for their use when the users need the database system (e.g., on the demand of the users). Some on-demand database services may store information from one or more tenants stored into tables of a common database image to form a multi-tenant database system (MTS). Accordingly, "on-demand database service 716" and "system 716" is used interchangeably herein. A database image may include one or more database objects. A relational database management system (RDMS) or the equivalent may execute storage and retrieval of information against the database object(s). Application platform 718 may be a framework that allows the applications of system 716 to run, such as the hardware and/or software, e.g., the operating system. In an embodiment, on-demand database service 716 may include an application platform 718 that enables creation, managing and executing one or more applications developed by the provider of the on-demand database service, users accessing the on-demand database service via user systems 712, or third party application developers accessing the on-demand database service via user systems 712.

The users of user systems 712 may differ in their respective capacities, and the capacity of a particular user system 712 might be entirely determined by permissions (permission levels) for the current user. For example, where a salesperson is using a particular user system 712 to interact with system 716, that user system has the capacities allotted to that salesperson. However, while an administrator is using that user system to interact with system 716, that user system has the capacities allotted to that administrator. In systems with a hierarchical role model, users at one permission level may have access to applications, data, and database information accessible by a lower permission level user, but may not have access to certain applications, database information, and data accessible by a user at a higher permission level. Thus, different users will have different capabilities with regard to accessing and modifying application and database information, depending on a user's security or permission level.

Network 714 is any network or combination of networks of devices that communicate with one another. For example, network 714 can be any one or any combination of a LAN (local area network), WAN (wide area network), telephone network, wireless network, point-to-point network, star network, token ring network, hub network, or other appropriate configuration. As the most common type of computer network in current use is a TCP/IP (Transfer Control Protocol and Internet Protocol) network, such as the global internetwork of networks often referred to as the "Internet" with a capital "I," that network will be used in many of the examples herein. However, it is understood that the networks that the claimed embodiments may utilize are not so limited, although TCP/IP is a frequently implemented protocol.

User systems 712 might communicate with system 716 using TCP/IP and, at a higher network level, use other common Internet protocols to communicate, such as HTTP, FTP, AFS, WAP, etc. In an example where HTTP is used, user system 712 might include an HTTP client commonly referred to as a "browser" for sending and receiving HTTP messages to and from an HTTP server at system 716. Such an HTTP server might be implemented as the sole network interface between system 716 and network 714, but other techniques might be used as well or instead. In some implementations, the interface between system 716 and network 714 includes load sharing functionality, such as round-robin HTTP request distributors to balance loads and distribute incoming HTTP requests evenly over a plurality of servers. At least as for the users that are accessing that server, each of the plurality of servers has access to the MTS' data; however, other alternative configurations may be used instead.

In one embodiment, system 716, shown in FIG. 7A, implements a web-based Customer Relationship Management (CRM) system. For example, in one embodiment, system 716 includes application servers configured to implement and execute CRM software applications as well as provide related data, code, forms, webpages and other information to and from user systems 712 and to store to, and retrieve from, a database system related data, objects, and Webpage content. With a multi-tenant system, data for multiple tenants may be stored in the same physical database object, however, tenant data typically is arranged so that data of one tenant is kept logically separate from that of other tenants so that one tenant does not have access to another tenant's data, unless such data is expressly shared. In certain embodiments, system 716 implements applications other than, or in addition to, a CRM application. For example, system 716 may provide tenant access to multiple hosted (standard and custom) applications, including a CRM application. User (or third party developer) applications, which may or may not include CRM, may be supported by the application platform 718, which manages creation, storage of the applications into one or more database objects and executing of the applications in a virtual machine in the process space of the system 716.

One arrangement for elements of system 716 is shown in FIG. 7A, including a network interface 720, application platform 718, tenant data storage 722 for tenant data 723, system data storage 724 for system data 725 accessible to system 716 and possibly multiple tenants, program code 726 for implementing various functions of system 716, and a process space 728 for executing MTS system processes and tenant-specific processes, such as running applications as part of an application hosting service. Additional processes that may execute on system 716 include database indexing processes.

Several elements in the system shown in FIG. 7A include conventional, well-known elements that are explained only briefly here. For example, each user system 712 may include a desktop personal computer, workstation, laptop, PDA, cell phone, or any wireless access protocol (WAP) enabled device or any other computing device capable of interfacing directly or indirectly to the Internet or other network connection. User system 712 typically runs an HTTP client, e.g., a browsing program, such as Microsoft's Internet Explorer browser, a Mozilla or Firefox browser, an Opera, or a WAP-enabled browser in the case of a smartphone, tablet, PDA or other wireless device, or the like, allowing a user (e.g., subscriber of the multi-tenant database system) of user system 712 to access, process and view information, pages and applications available to it from system 716 over network 714. Each user system 712 also typically includes one or more user interface devices, such as a keyboard, a mouse, trackball, touch pad, touch screen, pen or the like, for interacting with a graphical user interface (GUI) provided by the browser on a display (e.g., a monitor screen, LCD display, etc.) in conjunction with pages, forms, applications and other information provided by system 716 or other systems or servers. For example, the user interface device can be used to access data and applications hosted by system 716, and to perform searches on stored data, and otherwise allow a user to interact with various GUI pages that may be presented to a user. As discussed above, embodiments are suitable for use with the Internet, which refers to a specific global internetwork of networks. However, it is understood that other networks can be used instead of the Internet, such as an intranet, an extranet, a virtual private network (VPN), a non-TCP/IP based network, any LAN or WAN or the like.

According to one embodiment, each user system 712 and all of its components are operator configurable using applications, such as a browser, including computer code run using a central processing unit such as an Intel Pentium® processor or the like. Similarly, system 716 (and additional instances of an MTS, where more than one is present) and all of their components might be operator configurable using application(s) including computer code to run using a central processing unit such as processor system 717, which may include an Intel Pentium® processor or the like, and/or multiple processor units.

According to one embodiment, each system 716 is configured to provide webpages, forms, applications, data and media content to user (client) systems 712 to support the access by user systems 712 as tenants of system 716. As such, system 716 provides security mechanisms to keep each tenant's data separate unless the data is shared. If more than one MTS is used, they may be located in close proximity to one another (e.g., in a server farm located in a single building or campus), or they may be distributed at locations remote from one another (e.g., one or more servers located in city A and one or more servers located in city B). As used herein, each MTS may include one or more logically and/or physically connected servers distributed locally or across one or more geographic locations. Additionally, the term "server" is meant to include a computer system, including processing hardware and process space(s), and an associated storage system and database application (e.g., OODBMS or RDBMS) as is well known in the art. It is understood that "server system" and "server" are often used interchangeably herein. Similarly, the database object described herein can be implemented as single databases, a distributed database, a collection of distributed databases, a database with redundant online or offline backups or other redundancies, etc., and might include a distributed database or storage network and associated processing intelligence.

Figure 7B:
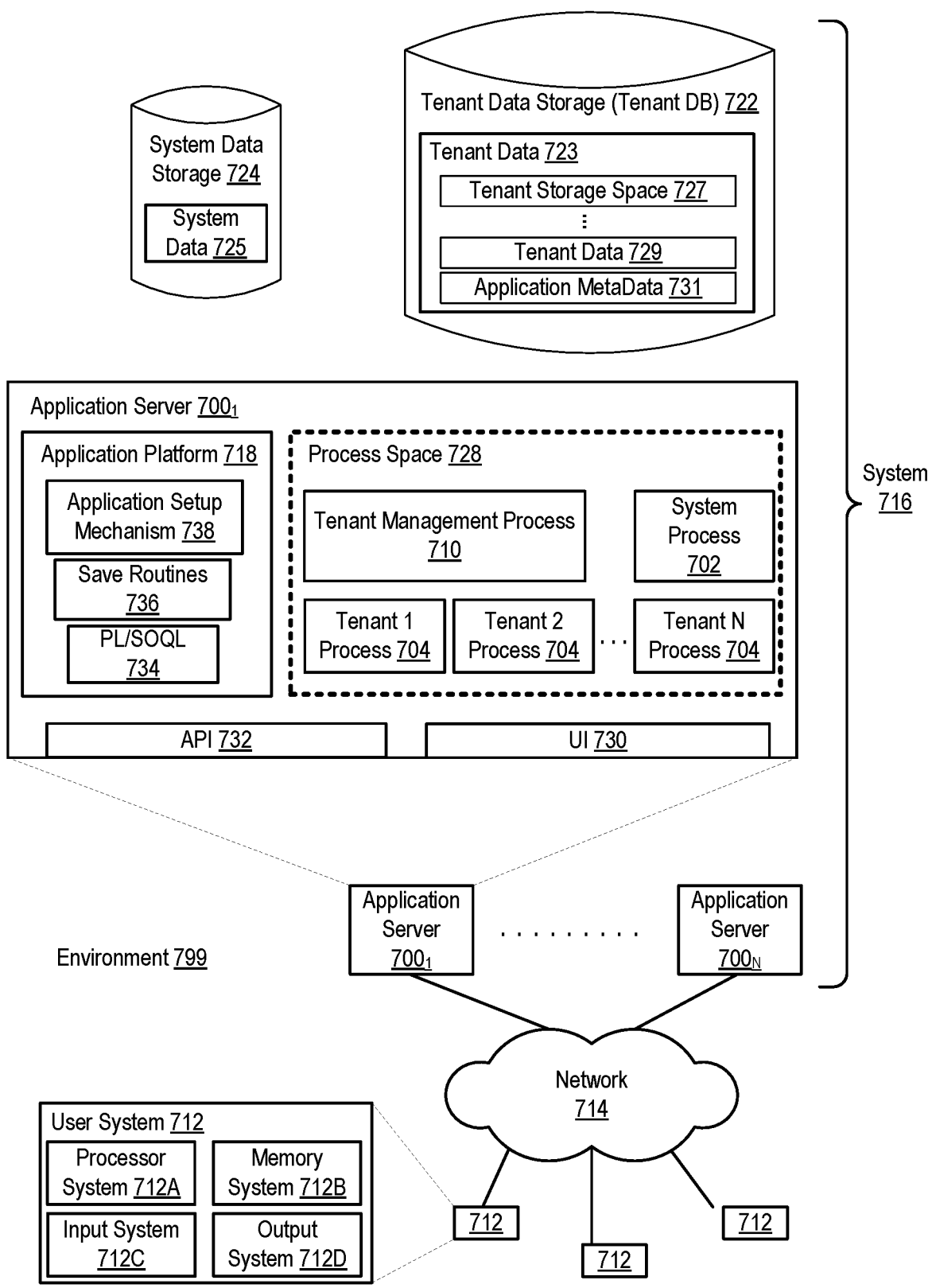
FIG. 7B illustrates another block diagram of an embodiment of elements of FIG. 7A and various possible interconnections between such elements, in accordance with described embodiments.

FIG. 7B illustrates another block diagram of an embodiment of elements of FIG. 7A and various possible interconnections between such elements in accordance with the described embodiments. FIG. 7B also illustrates environment 799. However, in FIG. 7B, the elements of system 716 and various interconnections in an embodiment are illustrated in further detail. More particularly, FIG. 7B shows that user system 712 may include a processor system 712A, memory system 712B, input system 712C, and output system 712D. FIG. 7B shows network 714 and system 716. FIG. 7B also shows that system 716 may include tenant data storage 722, having therein tenant data 723, which includes, for example, tenant storage space 727, tenant data 729, and application metadata 731. System data storage 724 is depicted as having therein system data 725. Further depicted within the expanded detail of application servers $700_{1-N}$ are User Interface (UI) 730, Application Program Interface (API) 732, application platform 718 includes PL/SOQL 734, save routines 736, application setup mechanism 738, process space 728 includes system process space 702, tenant 1-N process spaces 704, and tenant management process space 710. In other embodiments, environment 799 may not have the same elements as those listed above and/or may have other elements instead of, or in addition to, those listed above.

User system 712, network 714, system 716, tenant data storage 722, and system data storage 724 were discussed above in FIG. 7A. As shown by FIG. 7B, system 716 may include a network interface 720 (of FIG. 7A) implemented as a set of HTTP application servers 700, an application platform 718, tenant data storage 722, and system data storage 724. Also shown is system process space 702, including individual tenant process spaces 704 and a tenant management process space 710. Each application server 700 may be configured to tenant data storage 722 and the tenant data 723 therein, and system data storage 724 and the system data 725 therein to serve requests of user systems 712. The tenant data 723 might be divided into individual tenant storage areas (e.g., tenant storage space 727), which can be either a physical arrangement and/or a logical arrangement of data. Within each tenant storage space 727, tenant data 729, and application metadata 731 might be similarly allocated for each user. For example, a copy of a user's most recently used (MRU) items might be stored to tenant data 729. Similarly, a copy of MRU items for an entire organization that is a tenant might be stored to tenant storage space 727. A UI 730 provides a user interface and an API 732 provides an application programmer interface into system 716 resident processes to users and/or developers at user systems 712. The tenant data and the system data may be stored in various databases, such as one or more Oracle™ databases.

Application platform 718 includes an application setup mechanism 738 that supports application developers' creation and management of applications, which may be saved as metadata into tenant data storage 722 by save routines 736 for execution by subscribers as one or more tenant process spaces 704 managed by tenant management process space 710 for example. Invocations to such applications may be coded using PL/SOQL 734 that provides a programming language style interface extension to API 732. Invocations to applications may be detected by one or more system processes, which manages retrieving application metadata 731 for the subscriber making the invocation and executing the metadata as an application in a virtual machine.

Each application server 700 may be communicably coupled to database systems, e.g., having access to system data 725 and tenant data 723, via a different network connection. For example, one application server $700_1$ might be coupled via the network 714 (e.g., the Internet), another application server $700_{N-1}$ might be coupled via a direct network link, and another application server $700_N$ might be coupled by yet a different network connection. Transfer Control Protocol and Internet Protocol (TCP/IP) are typical protocols for communicating between application servers 700 and the database system. However, it will be apparent to one skilled in the art that other transport protocols may be used to optimize the system depending on the network interconnect used.

In certain embodiments, each application server 700 is configured to handle requests for any user associated with any organization that is a tenant. Because it is desirable to be able to add and remove application servers from the server pool at any time for any reason, there is preferably no server affinity for a user and/or organization to a specific application server 700. In one embodiment, therefore, an interface system implementing a load balancing function (e.g., an F5 Big-IP load balancer) is communicably coupled between the application servers 700 and the user systems 712 to distribute requests to the application servers 700. In one embodiment, the load balancer uses a least connections algorithm to route user requests to the application servers 700. Other examples of load balancing algorithms, such as round robin and observed response time, also can be used. For example, in certain embodiments, three consecutive requests from the same user may hit three different application servers 700, and three requests from different users may hit the same application server 700. In this manner, system 716 is multi-tenant, in which system 716 handles storage of, and access to, different objects, data and applications across disparate users and organizations.

As an example of storage, one tenant might be a company that employs a sales force where each salesperson uses system 716 to manage their sales process. Thus, a user might maintain contact data, leads data, customer follow-up data, performance data, goals and progress data, etc., all applicable to that user's personal sales process (e.g., in tenant data storage 722). In an example of a MTS arrangement, since all of the data and the applications to access, view, modify, report, transmit, calculate, etc., can be maintained and accessed by a user system having nothing more than network access, the user can manage his or her sales efforts and cycles from any of many different user systems. For example, if a salesperson is visiting a customer and the customer has Internet access in their lobby, the salesperson can obtain critical updates as to that customer while waiting for the customer to arrive in the lobby.

While each user's data might be separate from other users' data regardless of the employers of each user, some data might be organization-wide data shared or accessible by a plurality of users or all of the users for a given organization that is a tenant. Thus, there might be some data structures managed by system 716 that are allocated at the tenant level while other data structures might be managed at the user level. Because an MTS might support multiple tenants including possible competitors, the MTS may have security protocols that keep data, applications, and application use separate. Also, because many tenants may opt for access to an MTS rather than maintain their own system, redundancy, up-time, and backup are additional functions that may be implemented in the MTS. In addition to user-specific data and tenant specific data, system 716 might also maintain system level data usable by multiple tenants or other data. Such system level data might include industry reports, news, postings, and the like that are sharable among tenants.

In certain embodiments, user systems 712 (which may be client systems) communicate with application servers 700 to request and update system-level and tenant-level data from system 716 that may require sending one or more queries to tenant data storage 722 and/or system data storage 724. System 716 (e.g., an application server 700 in system 716) automatically generates one or more SQL statements (e.g., one or more SQL queries) that are designed to access the desired information. System data storage 724 may generate query plans to access the requested data from the database.

Each database can generally be viewed as a collection of objects, such as a set of logical tables, containing data fitted into predefined categories. A "table" is one representation of a data object, and may be used herein to simplify the conceptual description of objects and custom objects as described herein. It is understood that "table" and "object" may be used interchangeably herein. Each table generally contains one or more data categories logically arranged as columns or fields in a viewable schema. Each row or record of a table contains an instance of data for each category defined by the fields. For example, a CRM database may include a table that describes a customer with fields for basic contact information such as name, address, phone number, fax number, etc. Another table might describe a purchase order, including fields for information such as customer, product, sale price, date, etc. In some multi-tenant database systems, standard entity tables might be provided for use by all tenants. For CRM database applications, such standard entities might include tables for Account, Contact, Lead, and Opportunity data, each containing pre-defined fields. It is understood that the word "entity" may also be used interchangeably herein with "object" and "table."

In some multi-tenant database systems, tenants may be allowed to create and store custom objects, or they may be allowed to customize standard entities or objects, for example by creating custom fields for standard objects, including custom index fields. In certain embodiments, for example, all custom entity data rows are stored in a single multi-tenant physical table, which may contain multiple logical tables per organization. It is transparent to customers that their multiple "tables" are in fact stored in one large table or that their data may be stored in the same table as the data of other customers.

Figure 8:
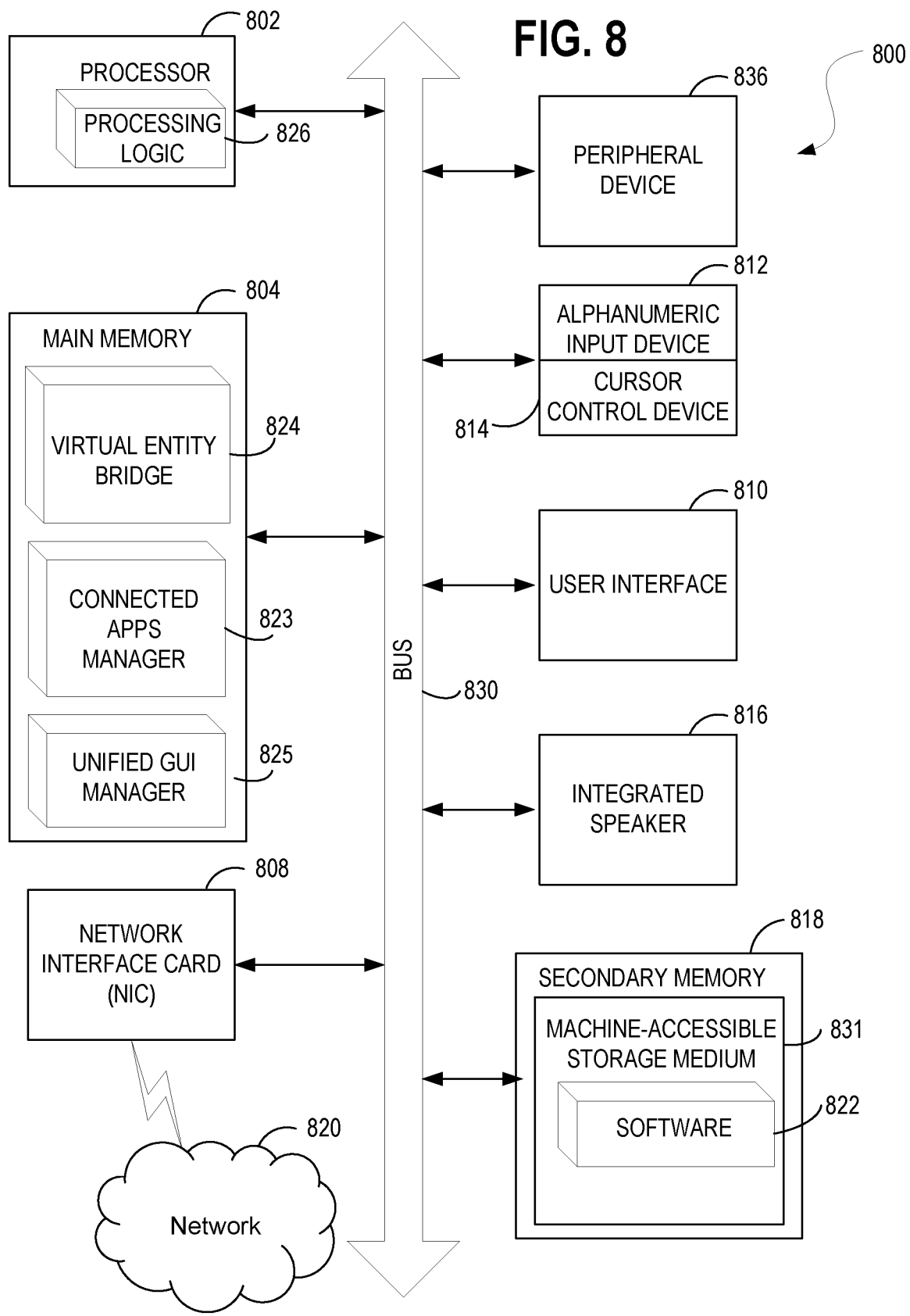
FIG. 8 illustrates a diagrammatic representation of a machine in the exemplary form of a computer system, in accordance with one embodiment.

FIG. 8 illustrates a diagrammatic representation of a machine 800 in the exemplary form of a computer system, in accordance with one embodiment, within which a set of instructions, for causing the machine/computer system 800 to perform any one or more of the methodologies discussed herein, may be executed. In alternative embodiments, the machine may be connected (e.g., networked) to other machines in a Local Area Network (LAN), an intranet, an extranet, or the public Internet. The machine may operate in the capacity of a server or a client machine in a client-server network environment, as a peer machine in a peer-to-peer (or distributed) network environment, as a server or series of servers within an on-demand service environment. Certain embodiments of the machine may be in the form of a personal computer (PC), a tablet PC, a set-top box (STB), a Personal Digital Assistant (PDA), a cellular telephone, a web appliance, a server, a network router, switch or bridge, computing system, or any machine capable of executing a set of instructions (sequential or otherwise) that specify actions to be taken by that machine. Further, while only a single machine is illustrated, the term "machine" shall also be taken to include any collection of machines (e.g., computers) that individually or jointly execute a set (or multiple sets) of instructions to perform any one or more of the methodologies discussed herein.

The exemplary computer system 800 includes a processor 802, a main memory 804 (e.g., read-only memory (ROM), flash memory, dynamic random access memory (DRAM) such as synchronous DRAM (SDRAM) or Rambus DRAM (RDRAM), etc., static memory such as flash memory, static random access memory (SRAM), volatile but high-data rate RAM, etc.), and a secondary memory 818 (e.g., a persistent storage device including hard disk drives and a persistent database and/or a multi-tenant database implementation), which communicate with each other via a bus 830. Main memory 804 includes a virtual entity bridge 824 for communicating with and retrieving remotely stored engagement activity data and history from a remote cloud platform as well as a connected apps manager 823 for communicating remote credential information to the remote cloud platform and a unified GUI manager 825 for integrating remotely retrieved engagement activity data from a remote marketing cloud platform such as Pardot with CRM data records retrieved from a local database of the host organization. Main memory 804 and its sub-elements are operable in conjunction with processing logic 826 and processor 802 to perform the methodologies discussed herein.

Processor 802 represents one or more general-purpose processing devices such as a microprocessor, central processing unit, or the like. More particularly, the processor 802 may be a complex instruction set computing (CISC) microprocessor, reduced instruction set computing (RISC) microprocessor, very long instruction word (VLIW) microprocessor, processor implementing other instruction sets, or processors implementing a combination of instruction sets. Processor 802 may also be one or more special-purpose processing devices such as an application specific integrated circuit (ASIC), a field programmable gate array (FPGA), a digital signal processor (DSP), network processor, or the like. Processor 802 is configured to execute the processing logic 826 for performing the operations and functionality which is discussed herein.

The computer system 800 may further include a network interface card 808. The computer system 800 also may include a user interface 810 (such as a video display unit, a liquid crystal display, etc.), an alphanumeric input device 812 (e.g., a keyboard), a cursor control device 814 (e.g., a mouse), and a signal generation device 816 (e.g., an integrated speaker). The computer system 800 may further include peripheral device 836 (e.g., wireless or wired communication devices, memory devices, storage devices, audio processing devices, video processing devices, etc.).

The secondary memory 818 may include a non-transitory machine-readable storage medium or a non-transitory computer readable storage medium or a non-transitory machine-accessible storage medium 831 on which is stored one or more sets of instructions (e.g., software 822) embodying any one or more of the methodologies or functions described herein. The software 822 may also reside, completely or at least partially, within the main memory 804 and/or within the processor 802 during execution thereof by the computer system 800, the main memory 804 and the processor 802 also constituting machine-readable storage media. The software 822 may further be transmitted or received over a network 820 via the network interface card 808.

While the subject matter disclosed herein has been described by way of example and in terms of the specific embodiments, it is to be understood that the claimed embodiments are not limited to the explicitly enumerated embodiments disclosed. To the contrary, the disclosure is intended to cover various modifications and similar arrangements as are apparent to those skilled in the art. Therefore, the scope of the appended claims are to be accorded the broadest interpretation so as to encompass all such modifications and similar arrangements. It is to be understood that the above description is intended to be illustrative, and not restrictive. Many other embodiments will be apparent to those of skill in the art upon reading and understanding the above description. The scope of the disclosed subject matter is therefore to be determined in reference to the appended claims, along with the full scope of equivalents to which such claims are entitled.

What is claimed is:

1. A method performed by a system having at least a processor and a memory therein executing within a host organization, wherein the method comprises:
   operating a database system communicably interfaced with the system of the host organization, wherein the database system stores Customer Relationship Management (CRM) records on behalf of a plurality of customer organizations which subscribe to cloud computing services from the host organization;
   executing instructions via the processor of the system for operating a virtual entity bridge at the host organization communicably interfacing the system with a remote cloud platform storing engagement activity data representing interactions of potential customers with a marketing campaign by one of the plurality of customer organizations;
   generating a unified Graphical User Interface (GUI) to display a plurality of CRM records at a user computing device;
   surfacing a plurality of related rows from the stored engagement activity data related to one of the plurality of CRM records by automatically querying the remote cloud platform via the virtual entity bridge for the plurality of related rows;
   populating the unified GUI with the surfaced plurality of related rows;
   transmitting the unified GUI to the user computing device for display, wherein the unified GUI displays the plurality of CRM records at the user computing device and responsively displays the surfaced plurality of related rows at the user computing device responsive to a selection of one of the plurality of CRM records via the unified GUI displayed to the user computing device;
   wherein the method further comprises:
   maintaining a related apps list defining a list of applications having authorization to query for the engagement activity data stored at the remote cloud platform;
   maintaining a users list correlating User IDs and OrgIDs managed by the host organization with tenant IDs managed by the remote cloud platform; and
   wherein any query from the host organization for the engagement activity data stored at the remote cloud platform is restricted to accessing only data associated with a single tenant ID managed by the remote cloud platform based on the users list.

2. The method of claim 1, wherein the system is configurable to perform the method by executing instructions for displaying marketing engagement data specific to one of the plurality of CRM records to the user computing device without syncing or integrating any of the marketing engagement data stored by the remote cloud platform into the database system storing the CRM records.

3. The method of claim 1, further comprising:
   authenticating with the remote cloud platform by passing a UserID uniquely identifying a user having authenticated with the host organization via the user computing device and an OrgID uniquely identifying the customer organization of the host organization with whom the UserID is associated.

4. The method of claim 1, further comprising:
   passing a userID or OrgID, or both, from the host organization to the remote cloud platform with an automatic query to the remote cloud platform via the virtual entity bridge;
   wherein the remote cloud platform identifies a single database slice or a single database shard having the requested plurality of related rows representing the interactions of potential customers with the marketing campaign by one of the plurality of customer organizations based on the userID or the OrgID passed with the automatic query; and
   wherein the remote cloud platform retrieves the requested plurality of related rows from a marketing database system operated by the remote cloud platform by issuing a query restricted to only the identified single database slice or the identified single database shard.

5. The method of claim 1, wherein the engagement activity data representing interactions of potential customers with a marketing campaign by one of the plurality of customer organizations tracks one or more of:
  interactions with a marketing campaign landing page linked to a specific contact stored within the plurality of CRM records;
  viewing or opening of an email originating a marketing campaign by one of the customer organizations linked to a specific sales lead record or a sales contact record; and
  viewing or submission of a form associated with the marketing campaign by one of the customer organizations linked to a specific sales lead record or a sales contact record.

6. The method of claim 1:
  wherein the remote cloud platform executes a public "REpresentational State Transfer" ("REST") API to receive an automatic query from the host organization over a public Internet.

7. The method of claim 1, further comprising:
  storing a queryable virtual entity for the stored engagement activity data within the database system of the host organization, wherein the queryable virtual entity is void of any of the stored engagement activity data; and
  wherein automatically querying the remote cloud platform via the virtual entity bridge for the plurality of related rows comprises issuing a query to the queryable virtual entity within the database system of the host organization; and
  wherein the virtual entity bridge forwards the query to a public REST API of the remote cloud platform requesting the plurality of related rows from the remote cloud platform; and
  returning the plurality of related rows to an originating application having issued the query to the queryable virtual entity within the database system of the host organization.

8. The method of claim 1, wherein the remote cloud platform operates a multi-tenant database system for persistently storing the engagement activity data.

9. The method of claim 1, wherein the remote cloud platform implements a Pardot marketing automation platform providing marketing campaign analytics and tracking of the engagement activity data stored by the remote cloud platform.

10. The method of claim 1, wherein the remote cloud platform persistently stores the engagement activity data via one of:
  an Amazon Web Services (AWS) public computing cloud accessible to the virtual entity bridge of the host organization;
  an AWS Direct Connect privately leased computing cloud accessible to the virtual entity bridge of the host organization;
  a Microsoft Azure public computing cloud accessible to the virtual entity bridge of the host organization; and
  an Azure ExpressRoute privately leased computing cloud accessible to the virtual entity bridge of the host organization.

11. Non-transitory computer readable storage media having instructions stored thereupon that, when executed by a system of a host organization having at least a processor and a memory therein, the instructions cause the system to perform operations including:
  operating a database system communicably interfaced with the system of the host organization, wherein the database system stores Customer Relationship Management (CRM) records on behalf of a plurality of customer organizations which subscribe to cloud computing services from the host organization;
  executing instructions via the processor of the system for operating a virtual entity bridge at the host organization communicably interfacing the system with a remote cloud platform storing engagement activity data representing interactions of potential customers with a marketing campaign by one of the plurality of customer organizations;
  generating a unified Graphical User Interface (GUI) to display a plurality of CRM records at a user computing device;
  surfacing a plurality of related rows from the stored engagement activity data related to one of the plurality of CRM records by automatically querying the remote cloud platform via the virtual entity bridge for the plurality of related rows;
  populating the unified GUI with the surfaced plurality of related rows;
  transmitting the unified GUI to the user computing device for display, wherein the unified GUI displays the plurality of CRM records at the user computing device and responsively displays the surfaced plurality of related rows at the user computing device responsive to a selection of one of the plurality of CRM records via the unified GUI displayed to the user computing device;
  wherein the instructions, when executed by the processor of the system, the instructions cause the system to perform operations further including:
  maintaining a related apps list defining a list of applications having authorization to query for the engagement activity data stored at the remote cloud platform;
  maintaining a users list correlating User IDs and OrgIDs managed by the host organization with tenant IDs managed by the remote cloud platform; and
  wherein any query from the host organization for the engagement activity data stored at the remote cloud platform is restricted to accessing only data associated with a single tenant ID managed by the remote cloud platform based on the users list.

12. The non-transitory computer readable storage media of claim 11, wherein the instructions, when executed by the processor of the system, cause the system to perform operations further including:
  authenticating with the remote cloud platform by passing a UserID uniquely identifying a user having authenticated with the host organization via the user computing device and an OrgID uniquely identifying the customer organization of the host organization with whom the UserID is associated.

13. The non-transitory computer readable storage media of claim 11, wherein the instructions, when executed by the processor of the system, cause the system to perform operations further including:
  passing a userID or OrgID, or both, from the host organization to the remote cloud platform with an automatic query to the remote cloud platform via the virtual entity bridge;
  wherein the remote cloud platform identifies a single database slice or a single database shard having the requested plurality of related rows representing the interactions of potential customers with the marketing campaign by one of the plurality of customer organizations based on the userID or the OrgID passed with the automatic query; and wherein the remote cloud platform retrieves the requested plurality of related rows from a marketing database system operated by the remote cloud platform by issuing a query restricted to only the identified single database slice or the identified single database shard.

14. The non-transitory computer readable storage media of claim 11, wherein the engagement activity data representing interactions of potential customers with a marketing campaign by one of the plurality of customer organizations tracks one or more of:
   interactions with a marketing campaign landing page linked to a specific contact stored within the plurality of CRM records;
   viewing or opening of an email originating a marketing campaign by one of the customer organizations linked to a specific sales lead record or a sales contact record; and
   viewing or submission of a form associated with the marketing campaign by one of the customer organizations linked to a specific sales lead record or a sales contact record.

15. The non-transitory computer readable storage media of claim 11:
   wherein the remote cloud platform executes a public "REpresentational State Transfer" ("REST") API to receive an automatic query from the host organization over a public Internet.

16. The non-transitory computer readable storage media of claim 11, wherein the instructions, when executed by the processor of the system, cause the system to perform operations further including:
   storing a queryable virtual entity for the stored engagement activity data within the database system of the host organization, wherein the queryable virtual entity is void of any of the stored engagement activity data; and
   wherein automatically querying the remote cloud platform via the virtual entity bridge for the plurality of related rows comprises issuing a query to the queryable virtual entity within the database system of the host organization; and
   wherein the virtual entity bridge forwards the query to a public REST API of the remote cloud platform requesting the plurality of related rows from the remote cloud platform; and
   returning the plurality of related rows to an originating application having issued the query to the queryable virtual entity within the database system of the host organization.

17. The non-transitory computer readable storage media of claim 11, wherein the remote cloud platform implements a Pardot marketing automation platform providing marketing campaign analytics and tracking of the engagement activity data stored by the remote cloud platform.

18. The non-transitory computer readable storage media of claim 11, the remote cloud platform persistently stores the engagement activity data via one of:
   an Amazon Web Services (AWS) public computing cloud accessible to the virtual entity bridge of the host organization;
   an AWS Direct Connect privately leased computing cloud accessible to the virtual entity bridge of the host organization;
   a Microsoft Azure public computing cloud accessible to the virtual entity bridge of the host organization; and
   an Azure ExpressRoute privately leased computing cloud accessible to the virtual entity bridge of the host organization.

19. A system to execute at a host organization, wherein the system comprises:
   a memory to store instructions;
   a processor to execute instructions;
   wherein the system is configured to execute the instructions via the processor to carry out operations including:
   operating a database system communicably interfaced with the system of the host organization, wherein the database system stores Customer Relationship Management (CRM) records on behalf of a plurality of customer organizations which subscribe to cloud computing services from the host organization;
   executing instructions via the processor of the system for operating a virtual entity bridge at the host organization communicably interfacing the system with a remote cloud platform storing engagement activity data representing interactions of potential customers with a marketing campaign by one of the plurality of customer organizations;
   generating a unified Graphical User Interface (GUI) to display a plurality of CRM records at a user computing device;
   surfacing a plurality of related rows from the stored engagement activity data related to one of the plurality of CRM records by automatically querying the remote cloud platform via the virtual entity bridge for the plurality of related rows;
   populating the unified GUI with the surfaced plurality of related rows;
   transmitting the unified GUI to the user computing device for display, wherein the unified GUI displays the plurality of CRM records at the user computing device and responsively displays the surfaced plurality of related rows at the user computing device responsive to a selection of one of the plurality of CRM records via the unified GUI displayed to the user computing device;
   wherein the system is further configured to execute the instructions via the processor to carry out operations including:
   maintaining a related apps list defining a list of applications having authorization to query for the engagement activity data stored at the remote cloud platform;
   maintaining a users list correlating User IDs and OrgIDs managed by the host organization with tenant IDs managed by the remote cloud platform; and
   wherein any query from the host organization for the engagement activity data stored at the remote cloud platform is restricted to accessing only data associated with a single tenant ID managed by the remote cloud platform based on the users list.

20. The system of claim 19, wherein the system is further configured to:
   pass a userID or OrgID, or both, from the host organization to the remote cloud platform with an automatic query to the remote cloud platform via the virtual entity bridge;
   wherein the remote cloud platform identifies a single database slice or a single database shard having the requested plurality of related rows representing the interactions of potential customers with the marketing campaign by one of the plurality of customer organizations based on the userID or the OrgID passed with the automatic query; and wherein the remote cloud platform retrieves the requested plurality of related rows from a marketing database system operated by the remote cloud platform by issuing a query restricted to only the identified single database slice or the identified single database shard.

21. The system of claim 19, wherein the remote cloud platform implements a Pardot marketing automation platform providing marketing campaign analytics and tracking of the engagement activity data stored by the remote cloud platform.

* * * * *